(12) United States Patent
Nakagawa

(10) Patent No.: US 6,640,922 B2
(45) Date of Patent: Nov. 4, 2003

(54) REAR WHEEL SUPPORTING DEVICE FOR VEHICLE

(75) Inventor: Mitsuo Nakagawa, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 38 days.

(21) Appl. No.: 09/924,527

(22) Filed: Aug. 9, 2001

(65) Prior Publication Data

US 2002/0020985 A1 Feb. 21, 2002

(30) Foreign Application Priority Data

Aug. 11, 2000 (JP) ........................................ 2000-244320

(51) Int. Cl.⁷ ................................................ B62M 7/00
(52) U.S. Cl. ...................................... 180/227; 280/284
(58) Field of Search ............................... 180/227, 219; 280/284, 285, 286

(56) References Cited

U.S. PATENT DOCUMENTS

| | | | | |
|---|---|---|---|---|
| 3,966,006 A | * | 6/1976 | Cullinan ..................... | 280/284 |
| 4,114,918 A | * | 9/1978 | Lutz ........................... | 280/284 |
| 4,706,774 A | * | 11/1987 | Tsuboi ........................ | 180/227 |
| 4,951,791 A | * | 8/1990 | Belil Creixelli ............ | 180/219 |
| 5,011,459 A | * | 4/1991 | Van De Vel ................ | 474/101 |
| 5,226,674 A | * | 7/1993 | Buell et al. ................ | 280/284 |
| 5,390,758 A | * | 2/1995 | Hunter et al. .............. | 180/228 |
| 5,487,443 A | * | 1/1996 | Thurm ........................ | 180/227 |
| 5,611,557 A | * | 3/1997 | Farris et al. ................ | 280/275 |
| 5,996,718 A | * | 12/1999 | Desrosiers .................. | 180/227 |
| 6,024,185 A | * | 2/2000 | Okada et al. ............... | 180/227 |
| 6,217,051 B1 | * | 4/2001 | Nakagawa et al. ......... | 280/303 |
| 6,378,644 B1 | * | 4/2002 | Brown et al. ............... | 180/227 |

FOREIGN PATENT DOCUMENTS

| JP | 1175590 | 7/1989 | | |
|---|---|---|---|---|
| JP | 06179387 A | * | 6/1994 | ........... B62K/25/26 |

* cited by examiner

Primary Examiner—Daniel G. DePumpo
Assistant Examiner—Paul Royal, Jr.
(74) Attorney, Agent, or Firm—Birch, Stewart, Kolasch & Birch, LLP.

(57) ABSTRACT

To enable common use of the vehicle body frame even when the rear wheel diameter has been changed. In a rear wheel supporting device for a vehicle, the pivot member is removably attached to a rear portion of the vehicle body frame. The swing member is vertically swingably attached on the pivot member. The rear wheel is rotatably mounted on the rear portion of the swing member. A plurality of mounting portions, which are vertically arranged, are provided on the vehicle body frame. The plurality of vertically arranged mounting portions are selected in accordance with the rear wheel diameter. The pivot member is installed, so that the mounting height of the pivot member will be freely adjustable.

16 Claims, 20 Drawing Sheets

FIG. 17(a)
FIG. 17(b)
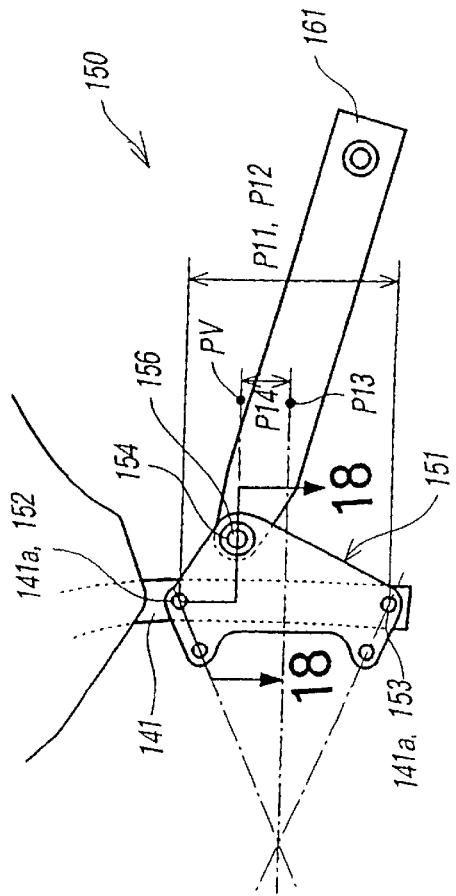
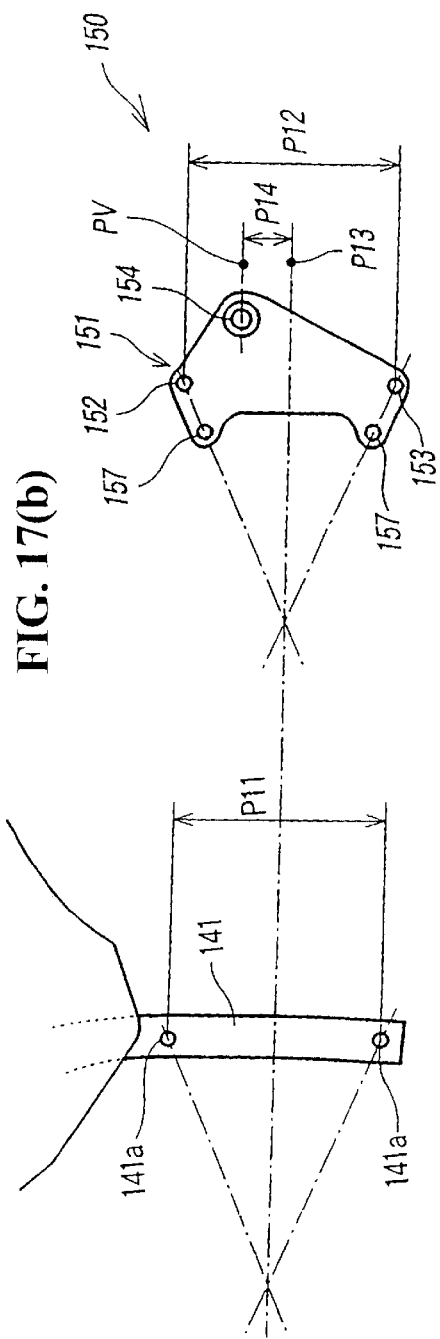

REAR WHEEL SUPPORTING DEVICE FOR VEHICLE

CROSS-REFERENCE TO RELATED APPLICATIONS

The present application claims priority under 35 USC 119 to Japanese Patent Application No. 2000-244320 filed on Aug. 11, 2000 the entire contents thereof are incorporated by reference.

BACKGROUND OF THE INVENTION

1. Field of the Invention

The present invention relates to a rear wheel supporting device for a vehicle for supporting a rear wheel at the rear of a vehicle body frame.

2. Description of Background Art

In a rear wheel supporting device for a vehicle, for example, two- and three-wheeled vehicles, a swing member is vertically swingably attached at the rear of the vehicle body frame. A rear wheel is rotatably mounted on the rear portion of the swing member. A rear wheel supporting device for a vehicle, is known as disclosed in, for example, Japanese Patent Laid-Open No. Hei 1-175590 Chain Adjuster of Motorcycles (hereinafter called "the prior art").

According to FIGS. 1 and 2 of Japanese Patent Laid-Open No. Hei 1-175590, a through hole is formed in the direction of a vehicle width in the rear portion of the frame 2 (the numerals used herein are the same as the numerals used in the prior art). An eccentric cam 12a is rotatably installed in the through hole. In the eccentric cam 12a is formed a shaft hole 13 which is off-center in the radial direction, and a pivot 3 of a rear swing arm 1 is rotatably installed in the shaft hole 13. Then, the rear swing arm 1 is vertically swingably installed at the rear portion of the frame 2. At the rear of the rear swing arm 1 is rotatably mounted a rear wheel 4.

According to the prior art described above, the mounting height of the pivot 3 in the rear swing arm 1 can be adjusted by turning the eccentric cam 12a. However, the adjustable range of the mounting height of the pivot 3 is very narrow, that is, within the range of an amount of the off-center of the shaft hole 13 formed in the eccentric cam 12a.

In a general motorcycle, the rear wheel is subject to a change in diameter depending upon the vehicle type from the viewpoint of commonality of the vehicle frame. With a change in the diameter of the rear wheel 4, the mounting height (ground clearance) of the pivot 3 varies. The adjustable range of the mounting height of the pivot 3 in the prior art stated above is very narrow and cannot be properly adjusted. To widen the adjustable range, it is necessary to increase the amount of the off-center of the shaft hole 13, which, however, will result in an increased diameter of the eccentric cam 12a, giving an effect to the shape and size of the frame 2 on which the eccentric cam 12a is mounted. The frame 2, therefore, will require a change. That is, every time the diameter of the rear wheel 4 is changed, the frame 2 is also changed. There is, therefore, a necessity to improve the rear wheel supporting device to reduce the cost of the vehicle, such as two- and three-wheeled vehicles.

SUMMARY AND OBJECTS OF THE INVENTION

It is, therefore, an object of the present invention to provide a support device capable of commonly being used with a vehicle body frame even in the case wherein the rear wheel diameter is changed.

According to the present invention, for attaining the object stated above, the rear wheel supporting device for the vehicle has a pivot member removably installed at the rear portion of the vehicle body frame, a swing member is vertically swingably attached to the pivot member, and a rear wheel is rotatably mounted at the rear portion of this swing member. The rear wheel supporting device is characterized by vertically arranging a plurality of joining portions on at least either one of the vehicle body frame and the pivot member, thereby enabling free adjustment of the mounting height of the pivot member.

According to the above-described structure, the mounting height of the pivot member can be freely adjusted by selecting the plurality of vertically arranged joining portions in accordance with the diameter of the rear wheel and attaching the pivot member. As a result, the mounting height of the swing member can be freely adjusted. Therefore, it is possible to commonly use the vehicle body frame and the swing member if the rear wheel diameter has been changed.

According to the present invention, in the rear wheel supporting device for a vehicle, the pivot member is removably attached at a rear portion of the vehicle body frame, the swing member is vertically swingably attached on the pivot member, and the rear wheel is rotatably mounted at the rear of the swing member. The rear wheel supporting device has, at the pivot member, the first and second joining portions in at least two points, upper and lower, for joining the rear wheel supporting device to the vehicle body frame, and a pivot point is located in a position close to the first joining portion above the middle height of said first and second joining portions, so that the height position of the pivot point may be altered by turning the pivot member upside down.

The height position of the pivot point can be changed by attaching the first and second joining portions to the vehicle body frame with the pivot member turned upside down in accordance with the diameter of the rear wheel. Consequently, it is possible to freely change the mounting height of the swing member. Therefore the vehicle body frame and the swing member are commonly usable if the diameter of the rear wheel is altered.

According to the present invention, in the rear wheel supporting device for a vehicle, the pivot member is removably attached at a rear portion of the vehicle body frame, the swing member is vertically swingably attached on the pivot member, and the rear wheel is rotatably mounted at the rear of the swing member. That is, the pivot member is attached on the rear surface of the vehicle body frame.

The pivot member can be installed to the vehicle body frame in such a manner that it will be removable from the rear.

The prior art stated above is of such a configuration that the eccentric cam 12a is rotatably installed in a hole formed in the direction of vehicle width in the frame 2; and the pivot 3 of the rear swing arm 1 is rotatably installed in the off-center shaft hole 13 of the eccentric cam 12a. If the range of the mounting height of the pivot 3 is widened, the eccentric cam 12a increases in diameter, therefore affecting the shape and size of the frame 2 on which the eccentric cam 12a is mounted.

According to the present invention, however, the pivot member is installed from the rear to the rear surface of the vehicle body frame; therefore, the vehicle body frame will be slightly affected if the range of the pivot member mounting height that is freely set. It is, therefore, possible to commonly use the vehicle body frame if the rear wheel diameter is changed.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 17(a) and 17(b) are views showing the configuration of the second embodiment of the rear wheel supporting device for a vehicle according to the present invention;

DETAILED DESCRIPTION OF THE PREFERRED EMBODIMENTS

Figure 1:
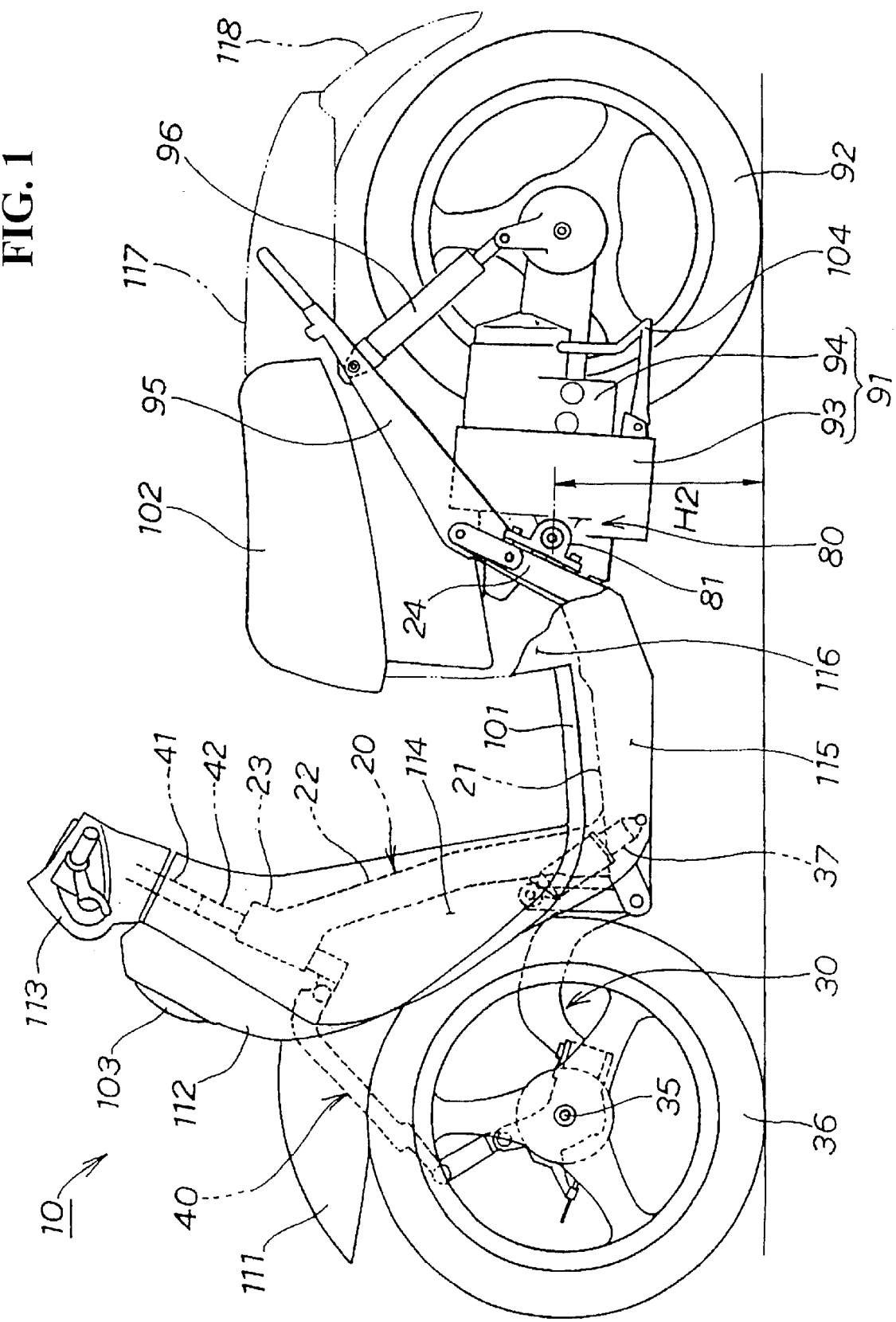
FIG. 1 is a left side view of a motorcycle of the first embodiment according to the present invention.

Preferred embodiments of the present invention will be described with reference to the accompanying drawings. In the drawings, the "front", "rear", "left", "right", "upper" and "lower" designations refer to the orientation of the vehicle in relation to the driver when normally sitting in the driver's seat. The drawings are to be viewed in the direction of reference numerals.

First, the first embodiment will be explained by referring to FIGS. 1 to 15. FIG. 1 is a left side view of a motorcycle of the first embodiment according to the present invention. The motorcycle 10 of the first embodiment is a scooter-type motorcycle having a front suspension system 30 and a steering system 40 mounted at the front portion of a vehicle body frame 20, a rear wheel supporting device 80 is installed at the rear portion of the vehicle body frame 20, a nearly horizontal floor step 101 is provided above the central portion of the vehicle body frame 20. A seat 102 is provided at the rear upper portion of the vehicle body frame 20. In the drawing, a handlebar 41, a headlight 103 and a stand 104 are provided.

Furthermore, the vehicle body of the motorcycle 10 is enclosed, from the front toward the rear, with a front fender 111, a front cover 112, a handlebar cover 113, a leg shield 114 covering the driver's leg area, a floor skirt 115, a center cover 116, a rear cover 117, and a rear fender 118.

Figure 2:
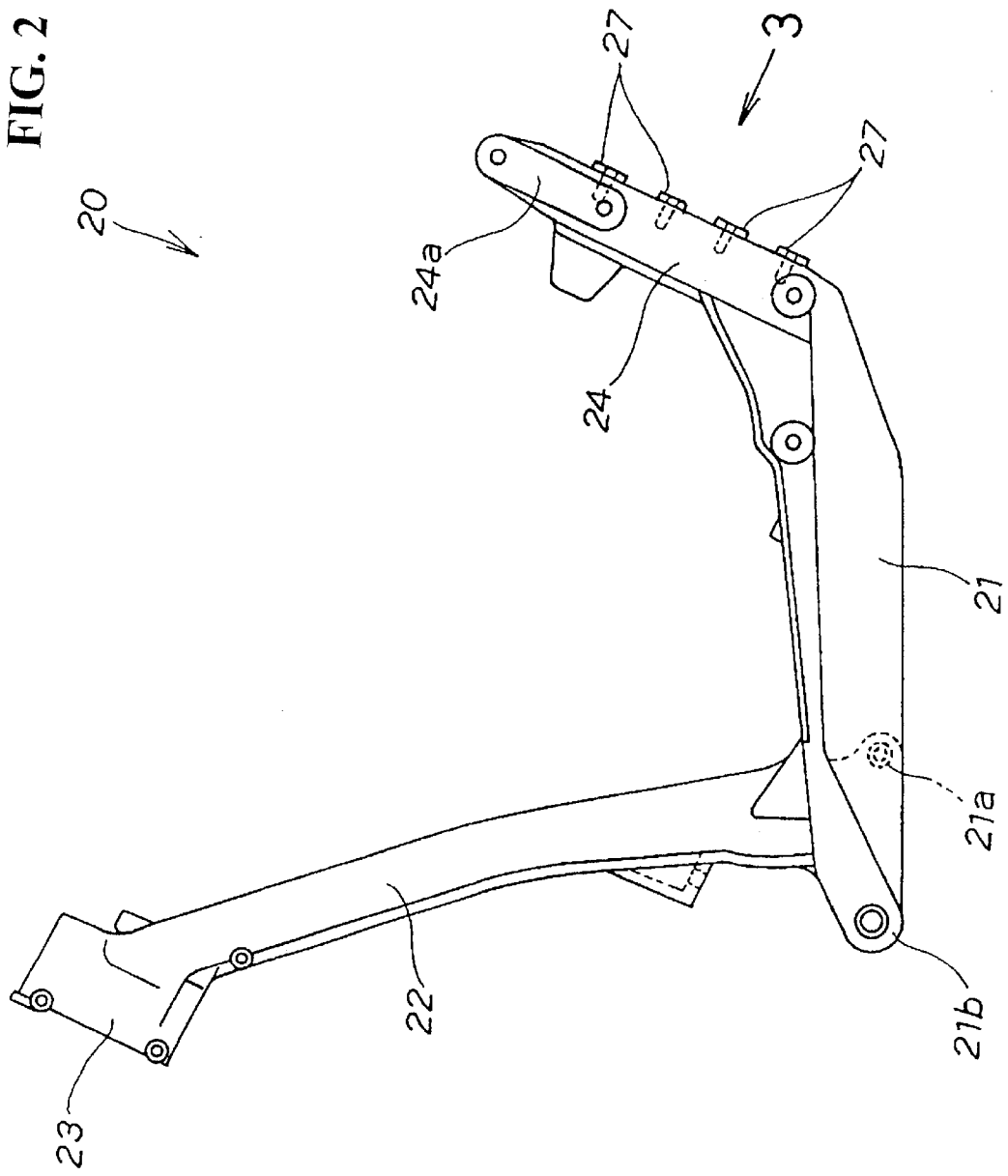
FIG. 2 is a left side view of a vehicle body frame according to the present invention.

FIG. 2 is a left side view of the vehicle body frame pertaining to the present invention. The vehicle body frame 20 is an aluminum-alloy casing, comprising a main frame 21 of a nearly horizontal frame structure, a head pipe post 22 extended upwardly from the front portion of the main frame 21, a head pipe 23 located at the top end of the head pipe post 22, and a rear rising portion 24 extended upwardly from the rear portion of the main frame 21.

The main frame 21 has a damper pivot portion 21a formed at the front, and a front support portion 21b extending forwardly from the front. The rear rising portion 24 is provided with a rear upper attaching portion 24a formed at the upper portion of the right and left sides.

Figure 3:
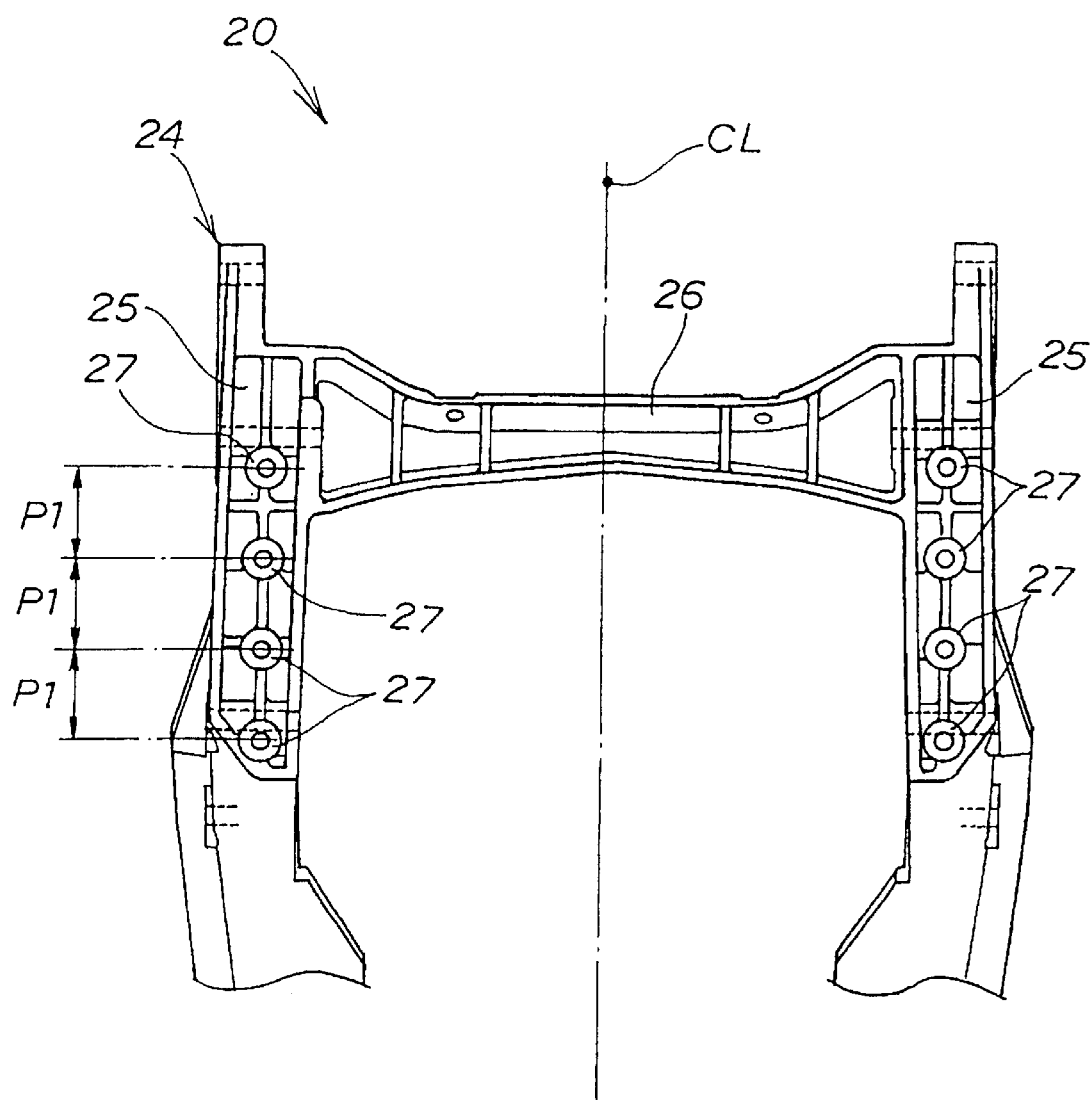
FIG. 3 is a view seen from the arrow 3 in FIG. 2.

FIG. 3 is a view seen from the arrow 3 of FIG. 2. The rear rising portion 24 is a unitary molding of a gate-shaped member as viewed from the rear, comprising right and left rising portions 25, 25, and a cross member 26 spanning at the upper portion across the rising portions 25, 25. The right and left rising portions 25, 25 are provided with a plurality of mounting portions 27 vertically arranged which are formed en bloc. The vertical pitches P1 of the mounting portions 27 are all identical. CL stands for the centerline of the vehicle width (vehicle body centerline).

Figure 4:
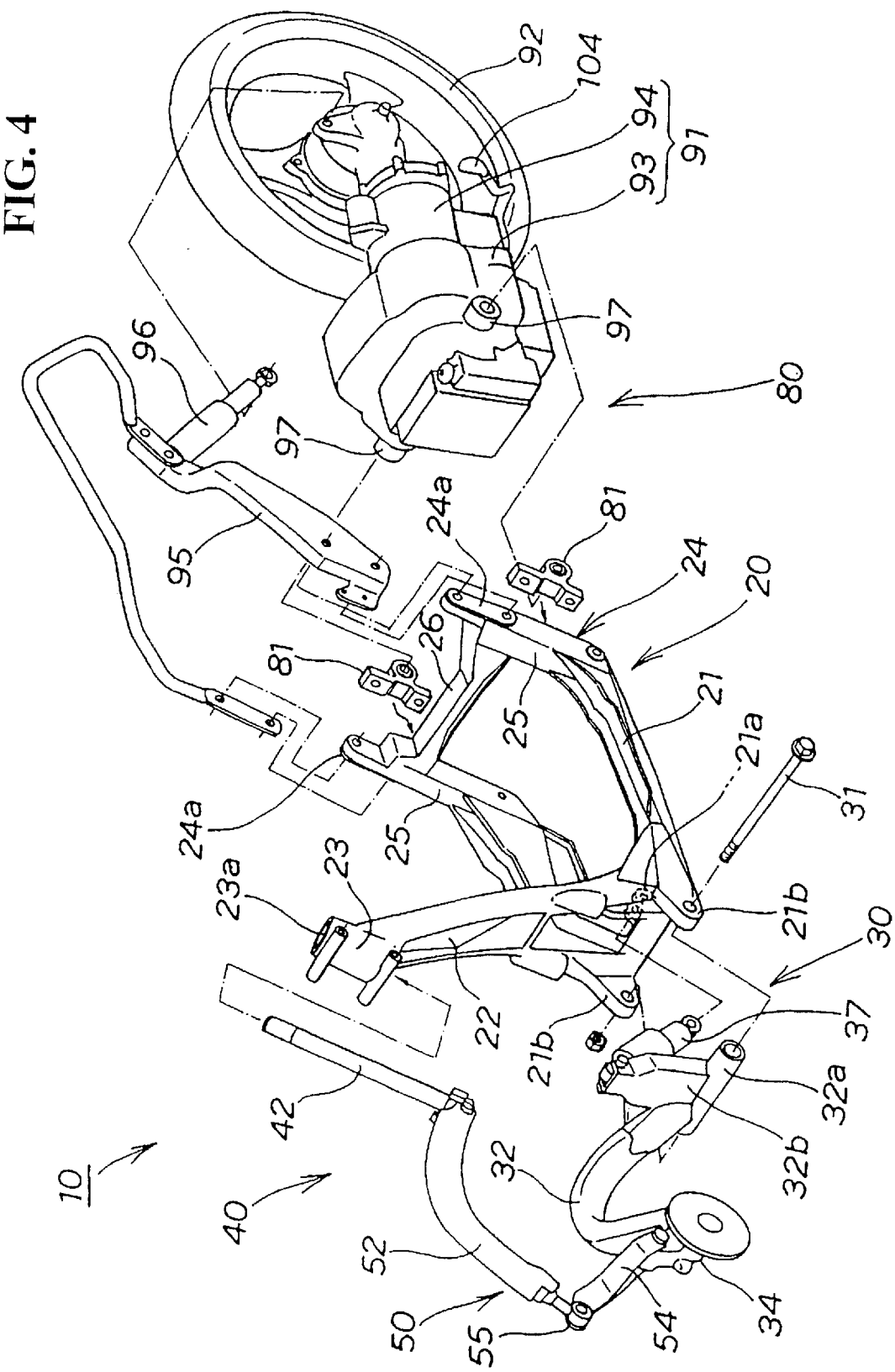
FIG. 4 is an exploded view of the motorcycle according to the present invention.

FIG. 4 is an exploded view of the motorcycle according to the present invention. In the rear wheel supporting device 80 of the motorcycle 10, pivot members 81, 81 are removably attached on the rear portion of the vehicle body frame 20. A power unit 91 is vertically swingably installed on these pivot members 81, 81. A rear wheel 92 is rotatably mounted at the rear portion of the power unit 91. The power unit 91 is a swingable member with an engine 93 and a transmission mechanism 94 for transmitting the power from the engine 93 to the rear wheel 92 assembled in one unit.

On the right and left rear upper joining portions 24a, 24a of the rear rising portion 24, a rear frame 95 having an approximately U-shape in a plan view is bolted. The rear frame 95 suspends the rear portion of the power unit 91 through a rear damper 96.

Figure 5:
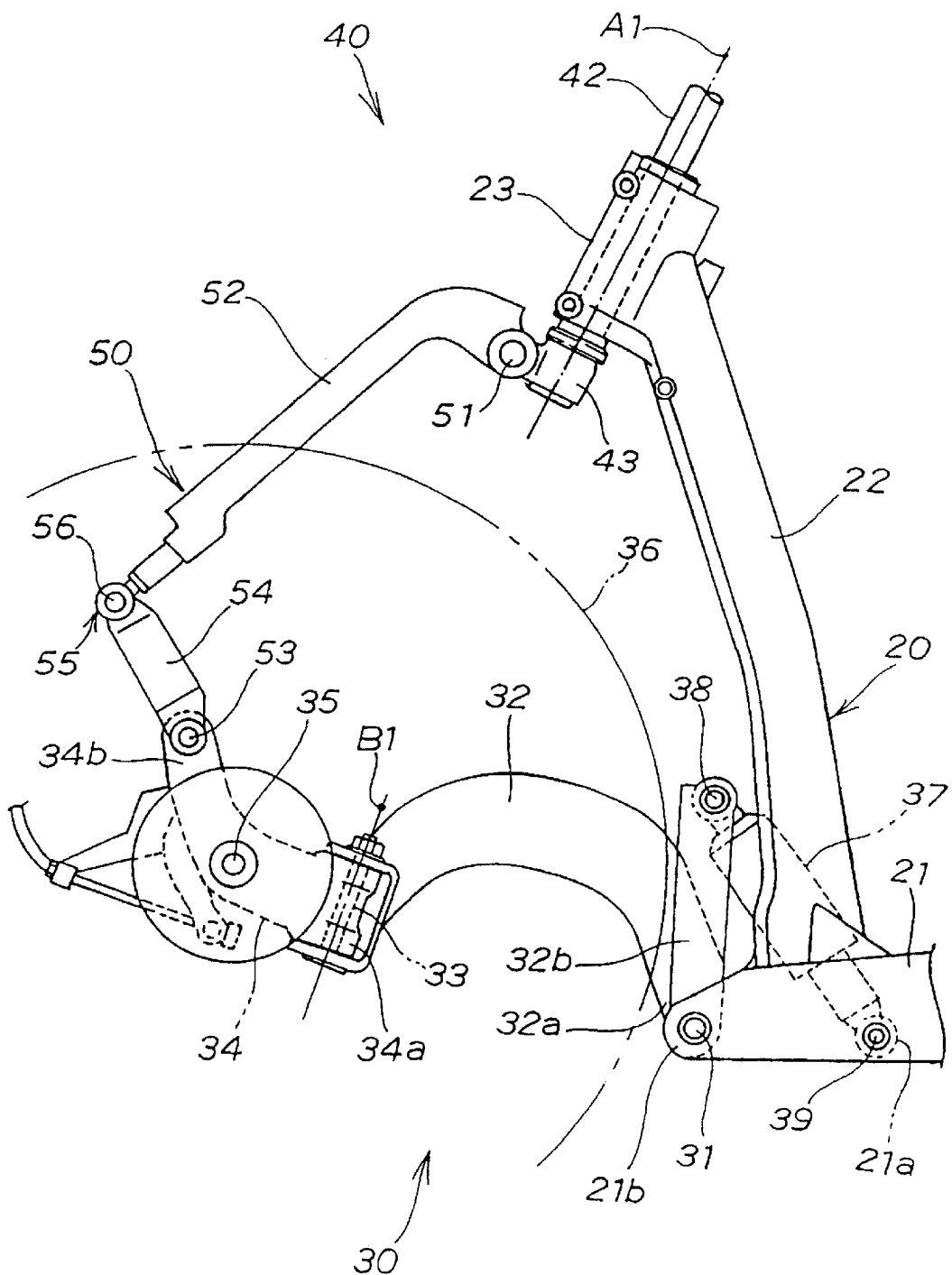
FIG. 5 is a left side view of the front portion of the motorcycle according to the present invention.

FIG. 5 is a left side view of the front portion of the motorcycle according to the present invention, showing the front suspension system 30 and the steering system 40.

The front suspension system 30 is of such a design that the base end portion 32a of the swing arm 32 which is of an approximately reversed U-shape as viewed in a side view is vertically swingably installed by a pivot shaft 31 to the front support section 21b of the main frame 21. An axle holder block 34 is swingably attached by a kingpin 33 to the front end of the swing arm 32. The front wheel 36 is rotatably mounted to the axle holder block 34 through an axle 35.

That is, the front suspension system 30 is a swing-arm type suspension system in which the swing arm 32 extends in a curved form to the right upper portion around the front wheel 36, to the front of the vehicle body from the front portion of the main frame 21, and the front wheel 36 is supported on only one end of the swing arm 32.

The axle holder block 34 has a supported portion (kingpin attaching portion) 34a for mounting the kingpin 33 at the rear lower part, the axle 35 at the center, and a knuckle 34b extended from the axle 35 forwardly and upwardly. The kingpin 33 may be unitarily formed with the axle holder block 34 through the supported portion 34a.

Furthermore, in the front suspension system 30, the swing arm 32 is suspended at the base portion through a front damper 37 on the damper pivot 21 a of the main frame 21. To be more specific, the rising portion 32b extends upwarly from the base end portion 32a of the swing arm 32. One end portion of the front damper 37 is connected by a pin 38 to the front end of the rising portion 32b. The other end portion of the front damper 37 is connected by a pin 39 to the damper pivot portion 21a.

In the steering system 40, the steering shaft 42 is rotatably attached to the head pipe 23, and the knuckle 34b is connected through a link mechanism 50 to a link member 43 at the lower end of the steering shaft 42.

To be more specific, in the steering system 40, one end of the link mechanism 50 is connected to the knuckle 34b of the axle holder block 34, and the other end of the link mechanism 50 is connected to the steering shaft 42, so that the front wheel 36 may be steered by means of the steering shaft 42. In the steering system 40 described above, the centerline B1 of the kingpin 33 can be offset forwardly or rearwardly in relation to the centerline A1 of the steering shaft 42.

The link mechanism 50 is an L-shaped link which can be bent in accordance with the up-and-down movement of the front wheel 36, with the link portion 55 between the first and second links 52 and 54 of the L-shaped link directed forwardly.

To describe in more detail, the link mechanism 50 includes (1) the first link 52 with one end vertically swingably connected by the first link pin 51 to the link member 43 of the steering shaft 42, (2) the second link 54 with its one end vertically swingably connected by the second link pin 53 to the forward end of the knuckle 34b, and (3) a universal joint 56 vertically swingably connecting the link portion 55 between the other ends of the first and second links 52 and 54, that is, between the first and second links 52 and 54. The universal joint 56 is for example a ball joint.

The first link 52 is a long link extending, while being curved, forwardly and downwardly from the first link pin 51 to the vicinity of the forward end of the knuckle 34b. The second link 54 is a shorter link than the first link 52.

As the front wheel 36 moves up and down, the swing arm 32 and the axle holder block 34 swing up and down in accordance with the up-and-down stoke of the front wheel 36. Consequently, the second link 54 and the first link 52 which are connected to the knuckle 34b also swing up and down.

Figure 6:
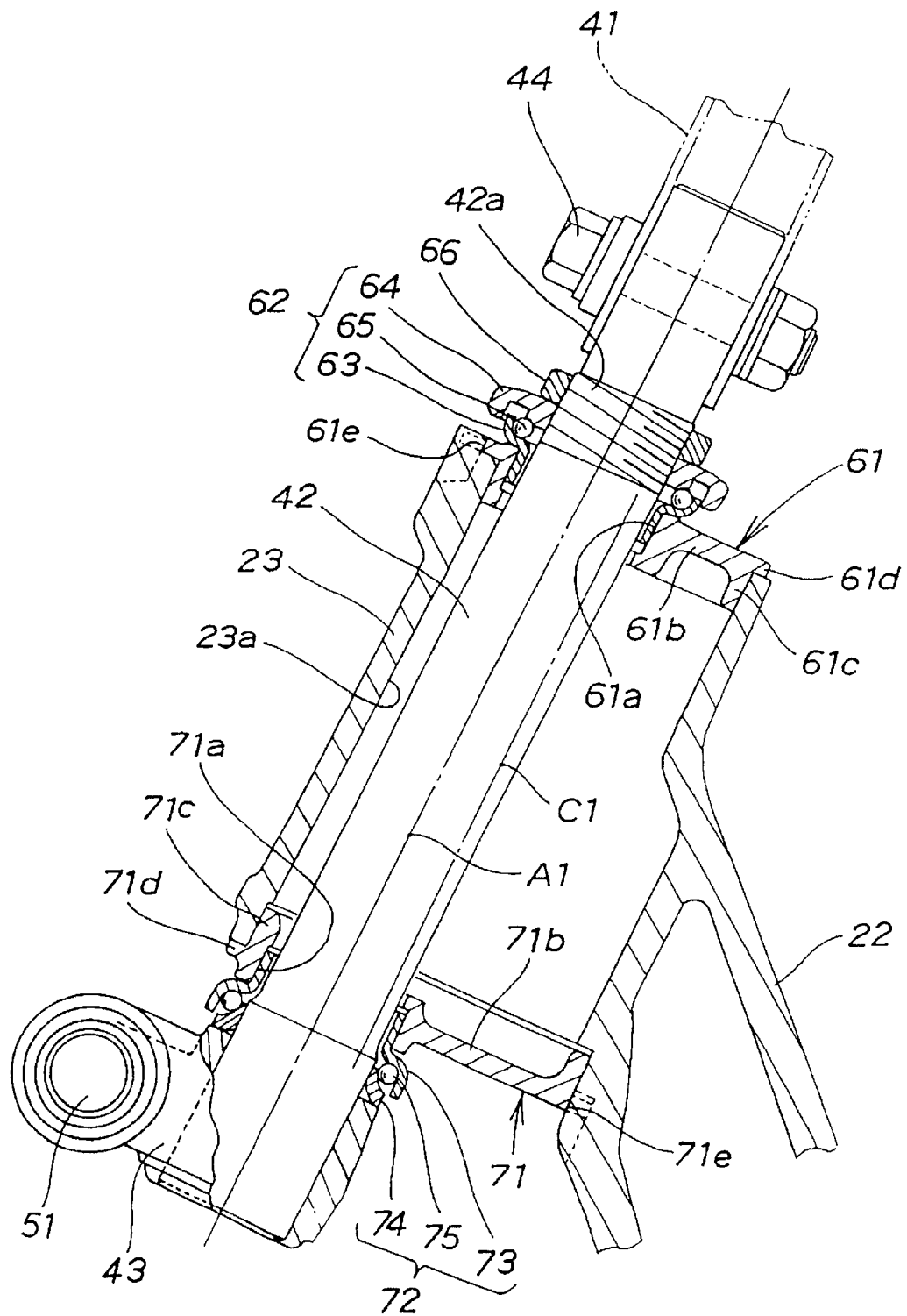
FIG. 6 is a view showing an example of mounting of the steering shaft according to a first embodiment of the present invention (No. 1)

FIG. 6 is a view of a first embodiment giving an example of mounting of the steering shaft of the present invention, showing the mounting structure of the steering shaft 42 in section.

The head pipe 23 is provided with a through hole 23a formed throughout its length for inserting the steering shaft 42. The through hole 23a is a hole formed relatively larger in diameter than the steering shaft 42 in order to enable the intersection of the centerline A1 of the steering shaft 42 at an optional angle with the centerline C1 of the head pipe 23. For example, the through hole 23a is a longitudinally long oval hole, or a large-diameter round hole, as compared with the diameter of the steering shaft 42.

The link member 43 of the steering shaft 42 is pressed in the steering shaft 42 and connected at the lower end portion by welding.

In the mounting structure of the steering shaft 42, a top plate 61 and a bottom plate 71 are interchangeably installed at the top and bottom ends of the head pipe 23; and the steering shaft 42 is inserted in the through hole 61a of the top plate 61 and in the through hole 71a of the bottom plate 71.

The top plate 61 supports the steering shaft 42 through a first bearing 62 and a lock nut 66. And the bottom plate 71 supports the steering shaft 42 through a second bearing 72.

To be more specific, the top plate 61 includes a body portion 61b having a through hole 61a, a fitting portion 61c which fits in the through hole 23a of the head pipe 23, a flange 61d mounted on the top end face of the head pipe 23, and a positioning slot 61e for positioning the top plate 61 on the projecting portion of the head pipe 23.

The first bearing 62 includes an outer race 63 which fits in the through hole 61a of the top plate 61, an inner race 64 which is screwed onto external threads 42a of the steering shaft 42, a number of balls 65 interposed between the outer and inner races 63 and 64, and an unillustrated retainer for holding the balls 65. The inner race 64 functions also as an adjusting nut.

The bottom plate 71 includes a body portion 71b having a through hole 71a, a fitting portion 71c which fits in the through hole 23a of the head pipe 23, a flange 71d mounted on the bottom end face of the head pipe 23, and a positioning slot 71e for positioning the bottom plate 71 on the projecting portion of the head pipe 23.

The second bearing 72 includes an outer race 73 which fits in the through hole 71a of the bottom plate 71, an inner race 74 which fits in the steering shaft 42, a number of balls 75 interposed between the outer and inner races 73 and 74, and an unillustrated retainer for holding the balls 75.

As is clear from the above explanation, the steering shaft 42 can rotatably be installed to the head pipe 23 through the top and bottom plates 61 and 71 and the first and second bearings 62 and 72. A mounting bolt 44 is provided for mounting the handlebar 41 at the top end portion of the steering shaft 42.

FIG. 6 shows that the centerline A1 of the steering shaft 42 is set nearly in parallel with the centerline C1 of the head pipe 23 (the center of the through hole 23a) and ahead of the centerline C1 of the head pipe 23. Accordingly, the center of the through holes 61a and 71a of the top and bottom plates 61 and 71 attached at the top and bottom ends of the head pipe 23 is in line with the centerline A1 of the steering shaft 42.

Figure 7:
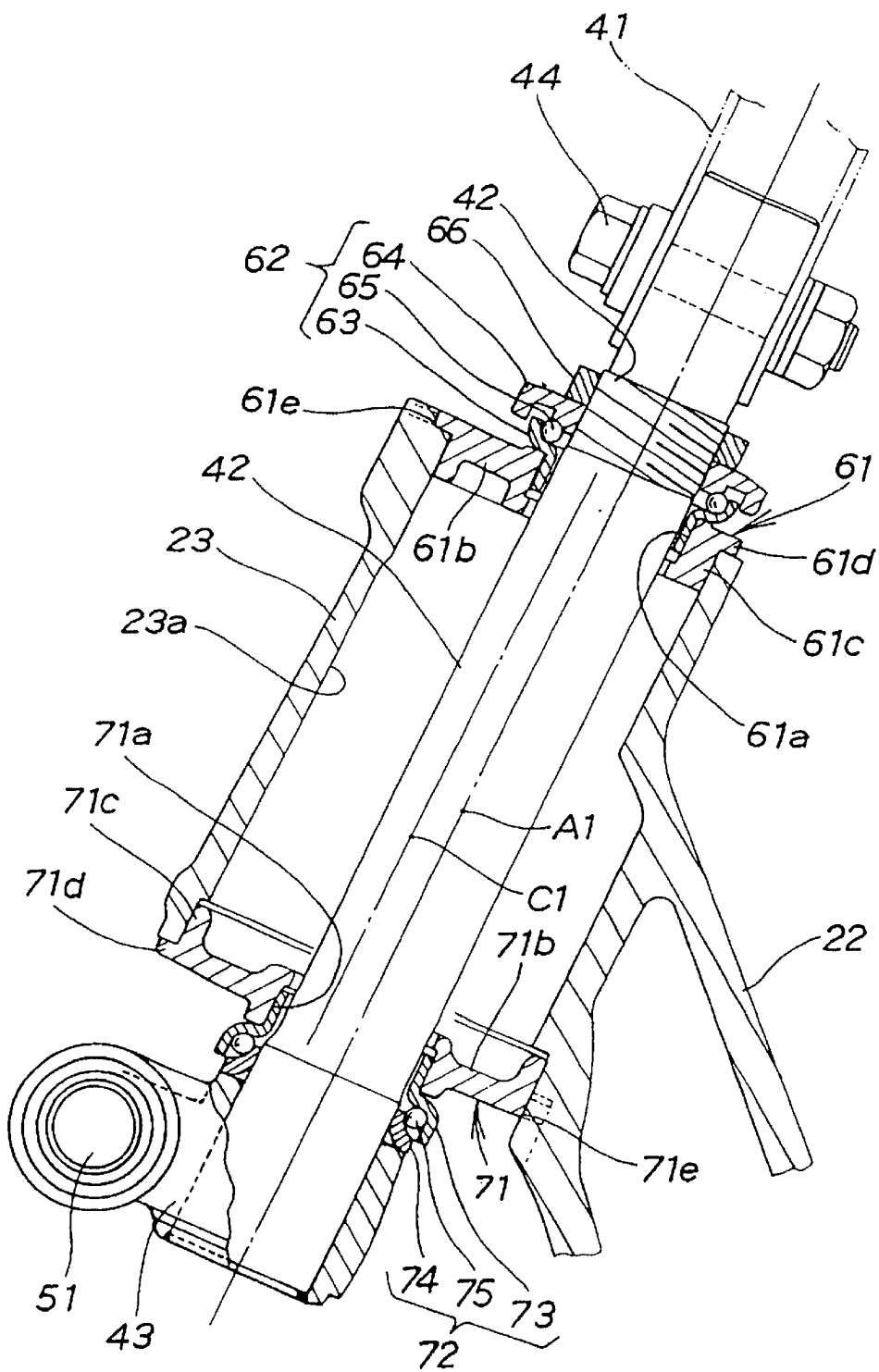
FIG. 7 is a view showing an example of mounting of the steering shaft according to a second embodiment of the present invention (No. 2)

FIG. 7 is a view of a second embodiment of the mounting of the steering shaft according to the present invention, in which the steering shaft 42 is mounted to the head pipe 23 with the centerline C1 of the steering shaft 42 set nearly in parallel with the centerline C1 of the head pipe 23 and behind the centerline C1 of the head pipe 23.

The center of the through holes 61a and 71a of the top and bottom plates 61 and 71 are installed at the top and bottom ends of the head pipe 23 and agree with the centerline A1 of the steering shaft 42. The position of the centerline A1 of the steering shaft 42 is changed by replacing the top and bottom plates 61 and 71 shown in FIG. 6 with the top and bottom plates 61 and 71 of FIG. 7.

Figure 8:
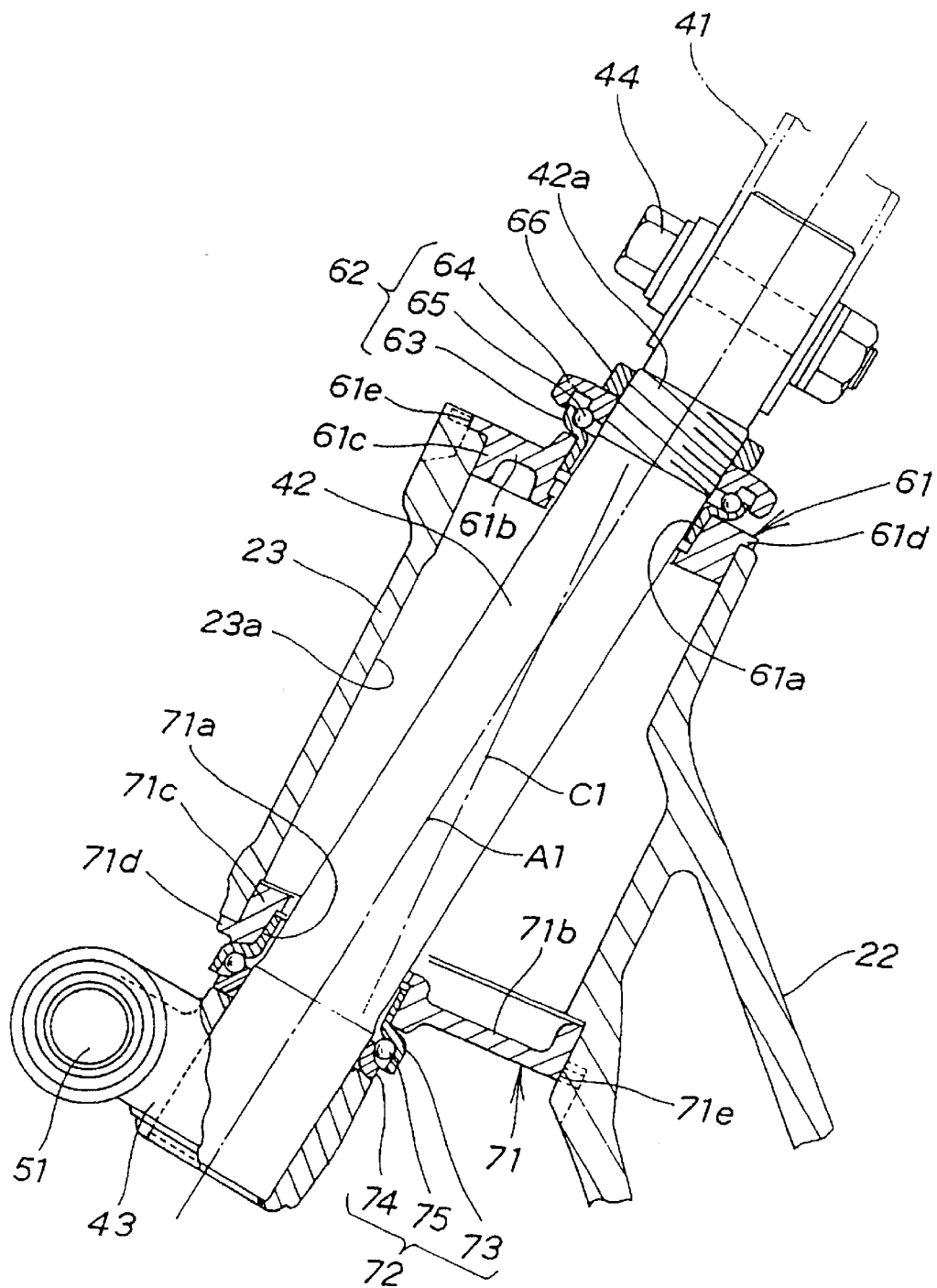
FIG. 8 is a view showing an example of mounting of the steering shaft according to a third embodiment of the present invention (No. 3)

FIG. 8 is a view of a third embodiment of the mounting of the steering shaft according to the present invention, in which the steering shaft 42 is mounted to the head pipe 23 with the centerline A1 of the steering shaft 42 intersecting forwardly of the centerline C1 of the head pipe 23 in order that the bottom end of the steering shaft 42 will be positioned ahead of the centerline C1 of the head pipe 23.

The center of the through holes 61a and 71a of the top and bottom plates 61 and 71 which are installed at the top and bottom ends of the head pipe 23 is in line with the centerline A1 of the steering shaft 42. The position of the centerline A1 of the steering shaft 42 is changed by replacing the top and bottom plates 61 and 71 of FIG. 6 with the top and bottom plates 61 and 71 of FIG. 8.

Figure 9:
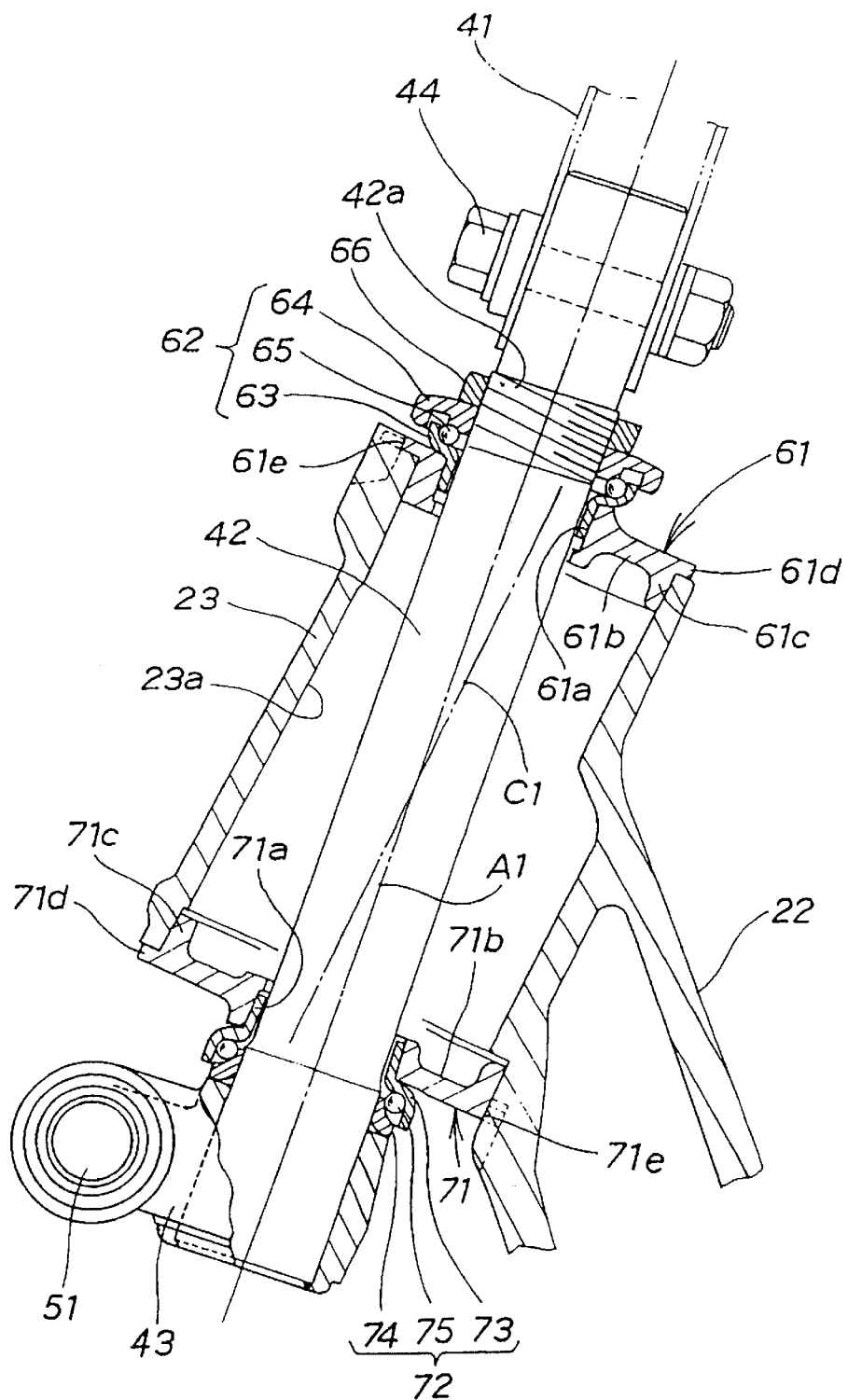
FIG. 9 is a view showing an example of mounting of the steering shaft according to a fourth embodiment of the present invention (No. 4)

FIG. 9 is a view of a fourth embodiment of the mounting of the steering shaft according to the present invention, in which the steering shaft 42 is mounted to the head pipe 23 with the centerline A1 of the steering shaft 42 intersecting rearwardly of the centerline C1 of the head pipe 23 so that the bottom end of the steering shaft 42 will be positioned to the rear of the centerline C1 of the head pipe 23.

The center of the through holes 61a and 71a of the top and bottom plates 61 and 71 are installed at the top and bottom ends of the head pipe 23 and is in line with the centerline A1 of the steering shaft 42. The position of the centerline A1 of the steering shaft 42 is changed by replacing the top and bottom plates 61 and 71 of FIG. 6 with the top and bottom plates 61 and 71 of FIG. 9.

Next, one example of a procedure for mounting the steering shaft 42 will be explained with reference to FIG. 6.

First, the second bearing 72 is installed on the steering shaft 42 which is provided with the link member 43, and the outer race 73 of the second bearing 72 is fitted in the through hole 71a of the bottom plate 71.

Next, the fitting portion 71c of the bottom plate 71 is fitted in the through hole 23a of the head pipe 23.

Next, the outer race 63 of the first bearing 62 is fitted in the through hole 61a of the top plate 61.

Next, the fitting portion 61c of the top plate 61 is fitted in the through hole 23a of the head pipe 23.

Next, the steering shaft 42 is inserted from below the lower outer race 73 and projects out of the upper outer race 63. Then, the balls 65 are inserted from the forward end of the steering shaft 42, and are set in the upper outer race 63.

Next, the inner race 64 of the first bearing 62 is screwed onto the external threads 42a of the steering shaft 42, to thereby enabling the rotatable installation of the steering shaft 42 to the head pipe 23 through the top and bottom plates 61 and 71 and the first and second bearings 62 and 72.

Furthermore, the first and second bearings 62 and 72 can be adjusted to the optimum state of mounting by adjusting the length of the thread engagement of the inner race 64.

Finally, after the lock nut 66 is tightened to the external threads 42a of the steering shaft 42, the handlebar 41 is installed by a mounting bolt 44 to the top end portion of the steering shaft 42, thus completing the mounting operation of the steering shaft 42.

Thereafter, to change the centerline A1 of the steering shaft 42 from the position shown in FIG. 6 to the position shown in FIG. 7, 8 or 9, the steering shaft 42 should first be removed once by reversing the mounting procedure stated above. Subsequently, any top and bottom plates 61 and 71 are selected and reinstalled by the mounting procedure stated above.

A method laid out for changing the angle and position of the centerline A1 of the steering shaft 42 in relation to the centerline C1 of the head pipe 23 will be explained as follows.

First prepared are a plurality of top plates 61 and a plurality of bottom plates 71 in which the center of the through holes 61a and 71a in relation to the centerline C1 of the head pipe 23 differs with the diameter of the front wheel 36. (First process)

The top and bottom plates 61 and 71 are selected every time a front wheel 36 of different a diameter as shown in FIG. 5 is adopted. (Second process)

The selected top and bottom plates 61 and 71 are attached to the head pipe 23, and then the steering shaft 42 is installed in the through holes 61a and 71a of the top and bottom plates 61 and 71. (Third process)

As is clear from the above explanation, it is possible to change the centerline A1 of the steering shaft 42 to a desired position and angle with respect to the centerline C1 of the head pipe 23 by replacing the plurality of top plates 61 and the plurality of bottom plates 71 in accordance with the diameter of the front wheel 36.

Figure 10:
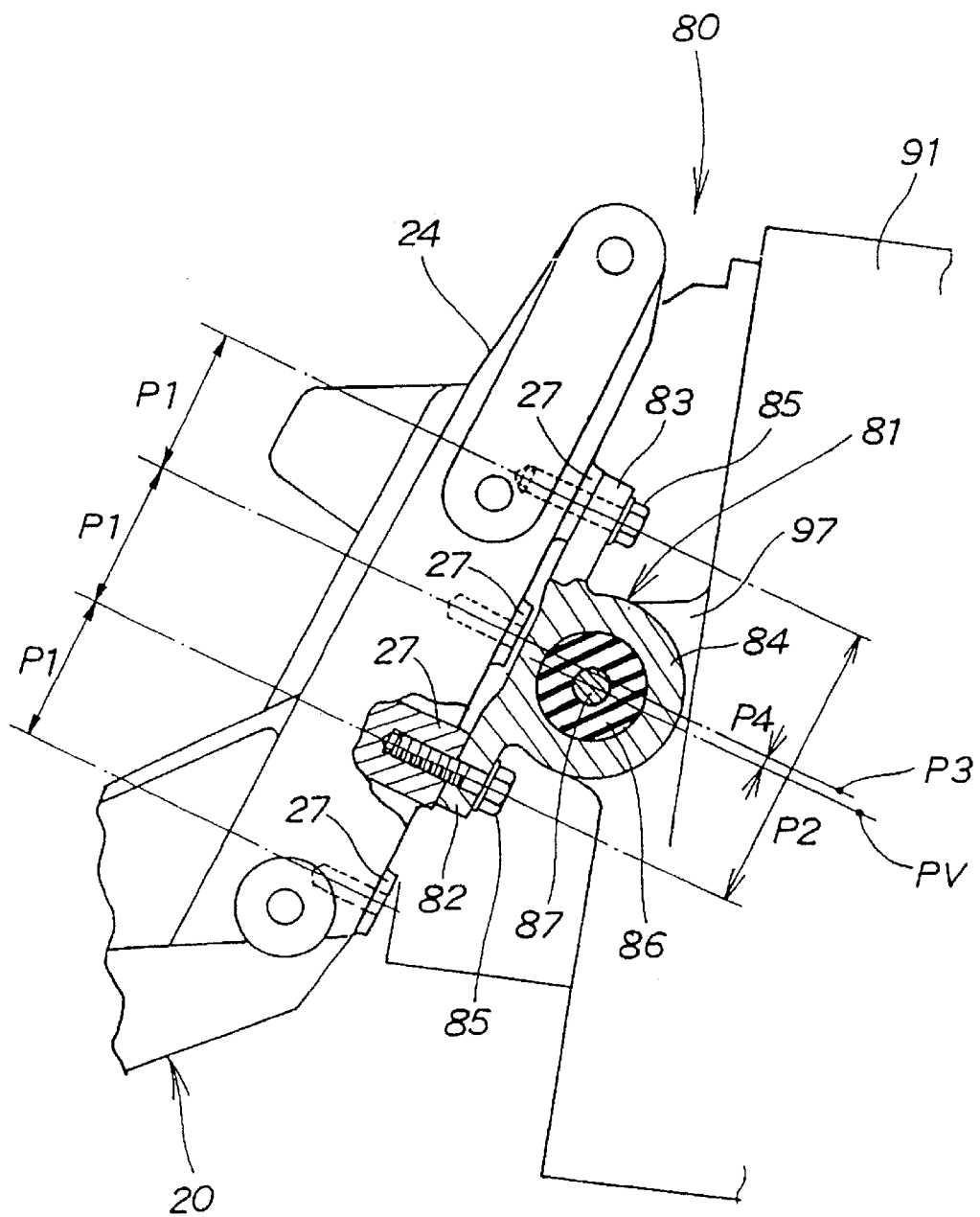
FIG. 10 is a left side view of the rear wheel supporting device for a vehicle according to a first embodiment of the present invention.

FIG. 10 is a left side view showing the first embodiment of the rear wheel supporting device for a vehicle according to the present invention. The rear wheel supporting device 80 is characterized in that the mounting height of the pivot member 81 can easily be adjusted by providing a plurality of (e.g., four) mounting portions 27 arranged vertically on the vehicle body frame 20. Furthermore, the rear wheel supporting device 80 is characterized in that the height position of the pivot point PV can be altered by turning the pivot member 81 upside down.

The pivot member 81 is an integrally-molded member comprising a first joining portion 82 and the second joining portion 83 provided in two points, upper and lower, and a pivot member 84 formed integrally with the first and second joining portions 82 and 83, for attaching to the rear surface of the vehicle body frame 20. The pivot portion 84 is disposed to the rear of the first and second joining portions 82 and 83.

The pitch P2 between the first and second joining portions 82 and 83, that is, the pitch P2 between the upper and lower bolt holes, is equal to twice (P2=2×P1) as large as the vertical pitch P1 between the mounting portions 27, 27. The middle height point P3 of the first and second joining portions 82 and 83 is positioned in the midpoint of the pitch P2.

The pivot member 81 can be joined to the rear surface of the vehicle body frame 20 by attaching the first and second joining portions 82 and 83 by bolts 85, 85 to desired mounting portions 27, 27.

The pivot portion 84 is installed on a pivot shaft 87 through a rubber bushing 86 in such a manner that the hanger portion 97 of the power unit 91 can swing up and down. In this case, the pivot point PV is set at the center of the pivot shaft 87 (i.e., the center of the pivot portion 84).

The pivot member 81 has the pivot point PV in a position moved, or offset, by the size P4 from the middle height point P3 of the first and second joining portions 82 and 83 toward the first joining portion 82.

FIGS. 11(a) to 11(d) are views explaining the operation of the rear wheel supporting device for a vehicle according to the present invention. In this drawing, four mounting portions 27 are termed, in order from above, the first mounting portion 27A, the second mounting portion 27B, the third mounting portion 27C, and the fourth mounting portion 27D.

Figures 11A, 11B, 11C, 11D:
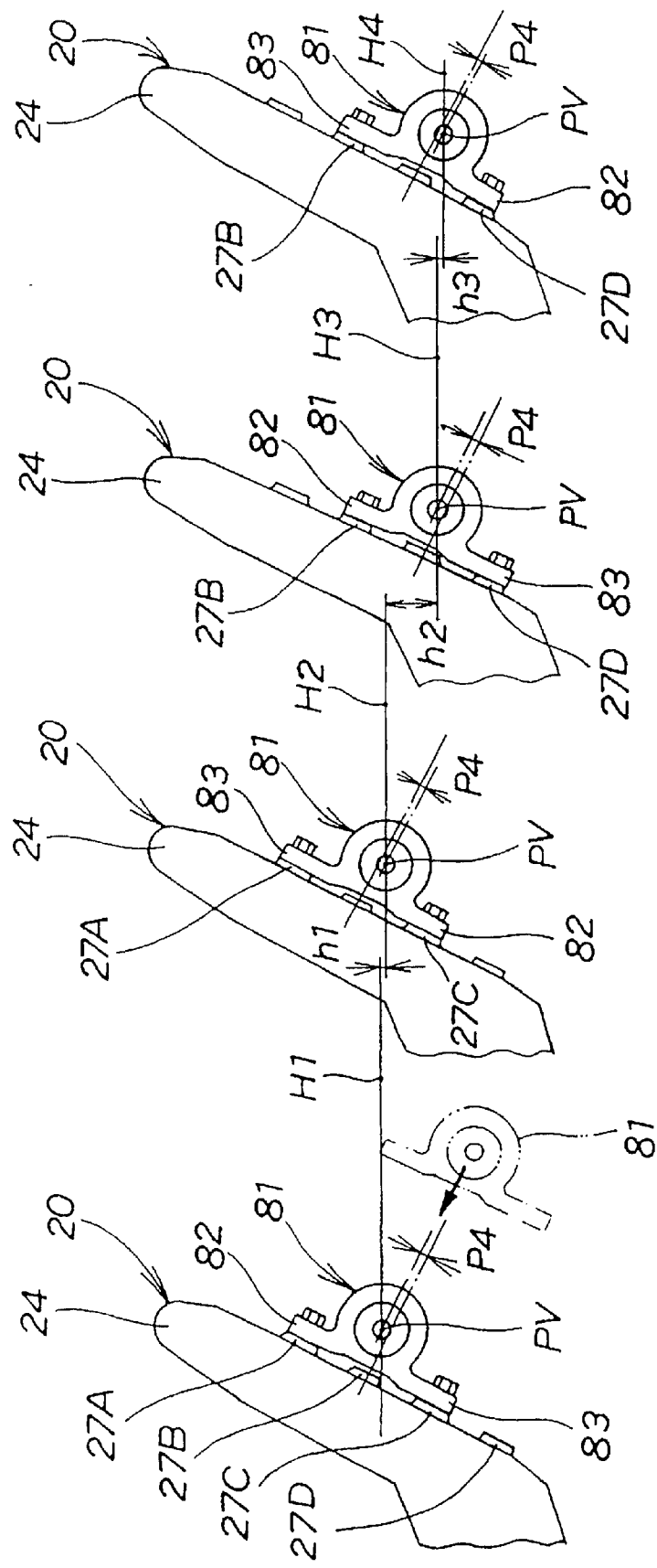
FIGS. 11(a), 11(b), 11(c), and 11(d) are explanatory views of the operation of the rear wheel supporting device for a vehicle according to the present invention.

FIG. 11(a) shows the pivot member 81 attached to the rear to the vehicle body frame 20. The first joining portion 82 is attached to the first mounting portion 27A and the second joining portion 83 is attached to the third mounting portion 27C. H1 denotes the height position of the pivot point PV FIG. 11(b) shows the height position of the pivot point PV that is changed by turning the pivot member 81 upside down from the state shown in (a) above. At this time, the second joining portion 83 is attached to the first mounting portion 27A, and the first joining portion 82 is attached to the third mounting portion 27C. H2 denotes the height position of the pivot point PV, which is lower by the height hi than the height position H1.

FIG. 11(c) shows the first joining portion 82 attached to the second mounting portion 27B with the pivot member 81 placed in the same orientation as shown in (a) above, and the second joining portion 83 attached to the fourth mounting portion 27D. H3 denotes the height position of the pivot point PV, which is lower by the height h2 than the height position H2.

FIG. 11(d) shows the height position of the pivot point PV changed by turning the pivot member 81 upside down from the state shown in (c) above. At this time, the second joining portion 83 is attached to the second mounting portion 27B, and the first joining portion 82 is attached to the fourth mounting portion 27D. H4 refers to the height position of the pivot point PV, which is lower by the height h3 than the height position H3.

As is clear from the above explanation, the plurality of mounting portions 27 are vertically arranged on the vehicle body frame 20. Therefore, the first and second joining portions 82 and 83 are selectively and removably installed to these mounting portions 27, to thereby enable free adjustment of the mounting height of the pivot member 81. Consequently, it is possible to freely change the mounting height of the power unit 91 as shown in FIG. 10.

Furthermore, the height position of the pivot point PV can be changed by attaching the pivot member 81 upside down to the mounting portions 27. Consequently, the mounting height of the power unit 91 shown in FIG. 10 can be changed as desired.

Figure 12:
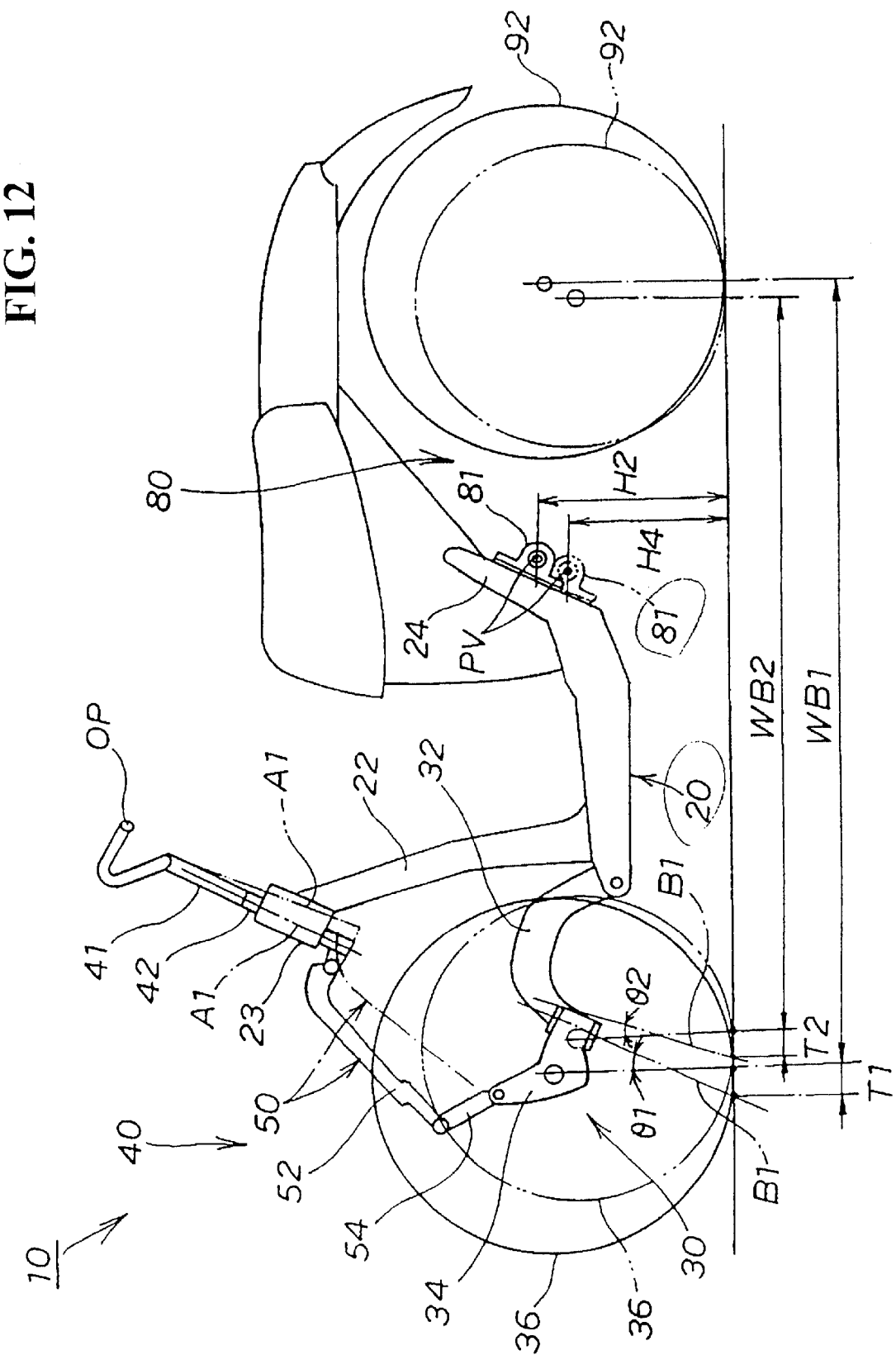
FIG. 12 is a schematic view of the motorcycle according to the present invention.

FIG. 12 is a schematic view of a motorcycle according to the present invention, in which the following (1) and (2) are compared. The motorcycle 10 is mounted with a large-diameter front wheel 36 and rear wheel 92 indicated by a solid line. The front suspension system 30, steering system 40, and rear wheel supporting device 80 are located in positions indicated by a solid line. In this arrangement, WB1 refers to the wheelbase between the front and rear wheels 36 and 92; $\theta 1$, the caster angle of the centerline B1 of the kingpin; T1, the trail of the front wheel 36; and H2, the height position of the pivot point PV.

The motorcycle 10 is mounted with a small-diameter front wheel 36 and rear wheel 92 indicated by a phantom line. The front suspension system 30, the steering system 40, and the rear wheel supporting device 80 are arranged in locations indicated by phantom lines. In this arrangement, WB2 denotes a wheelbase between the front wheel 36 and the rear wheel 92; $\theta 2$, the caster angle of the centerline B1 of the kingpin; T2, the trail of the front wheel 36; and H4, the height position of the pivot point PV.

When the large-diameter front wheel 36 and the small-diameter front wheel 36 have been replaced with each other, the optimum caster angles 1 and 2 and the trails T1 and T2 should be set with the steering properties taken into account. Furthermore, the arrangement of the front suspension system 30 and the steering system 40 should be set in accordance with these caster angles $\theta 1$ and $\theta 2$ and the trails T1 and T2.

For example, even when the diameter of the front wheel 36 has been altered, the operating position OP of the handlebar 41 can be set to nearly the same position simply by changing the inclination and position of the centerline A1 of the steering shaft 42 in relationship to the head pipe 23.

Furthermore, when the large-diameter rear wheel 92 and the small-diameter rear wheel 92 have been replaced with each other, only the adjustment of the mounting height of the pivot member 81 is needed.

As is clear from the above explanation, the centerline A1 of the steering shaft 42 can be changed to a desired position and angle in accordance with the diameter of the front wheel 36. Therefore, there is no necessity to change the position of the head pipe 23 which is formed unitarily with the vehicle body frame 20 if the diameter of the front wheel 36 has been changed.

Furthermore, the mounting height of the pivot member 81 in relationship to the vehicle body frame 20 is freely changeable in accordance with the diameter of the rear wheel 92.

Consequently, the vehicle body frame 20 is commonly usable even when the diameter of the front wheel 36 and/or the diameter of the rear wheel 92 have been changed, thereby enabling the cost reduction of the motorcycle 10.

Furthermore, the steering shaft 42 and the link mechanism 50 of at least the steering system 40 become commonly usable by setting the caster angles $\theta 1$ and $\theta 2$ and the trails T1 and T2 as appropriate. In the front suspension system 30, only a change of the swing arm 32 is required.

Furthermore, the rate of the turning angle of the front wheel 36 in relationship to the steering angle of the steering shaft 42 can be altered by changing the length of the first and second links 52 and 54 in accordance with the diameter of the front wheel 36. Therefore, it is possible to change the steering force to be exerted to the steering shaft 42 to the optimum value by thus changing the rate of the turning angle stated above.

Figure 13:
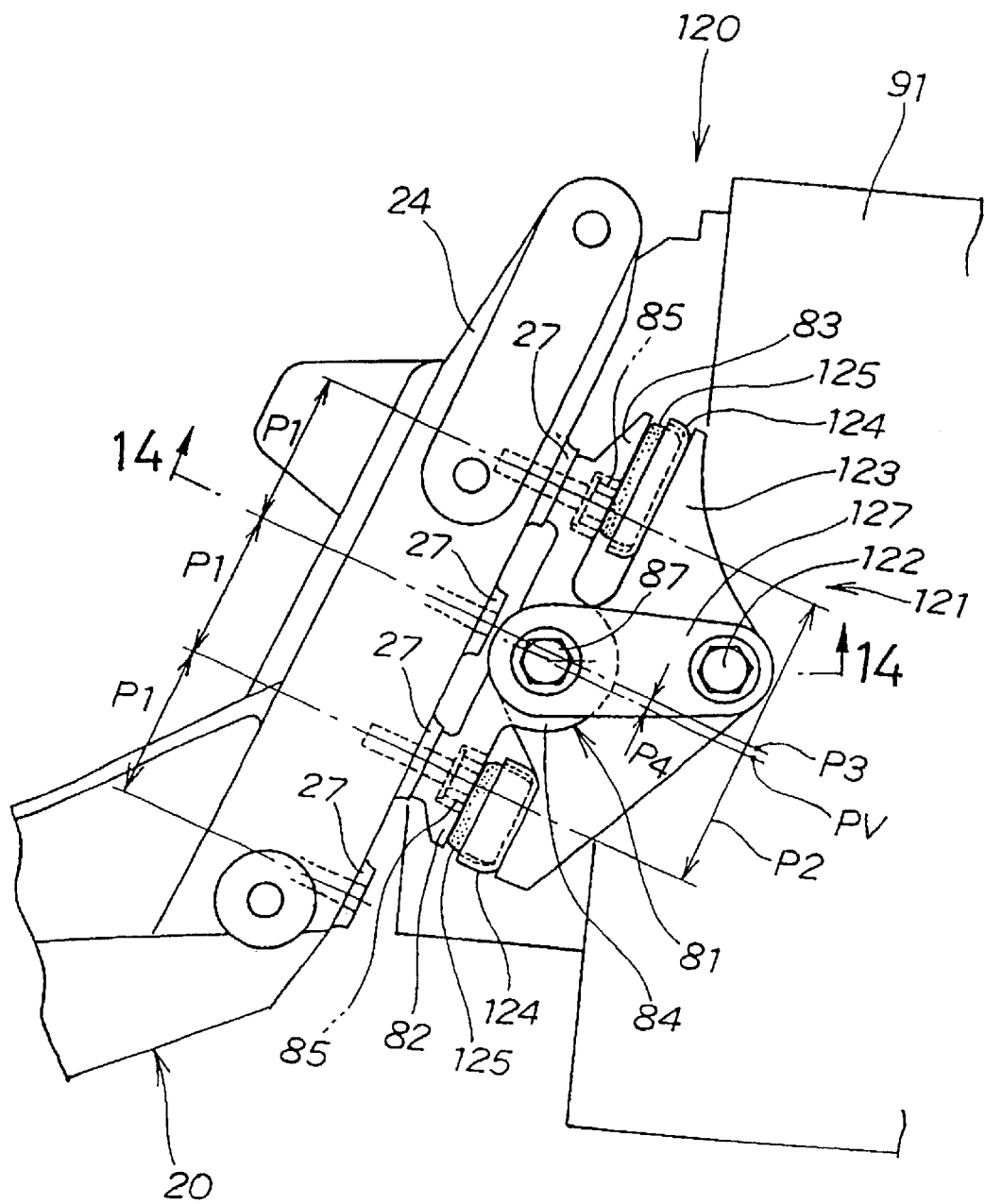
FIG. 13 is a left side view of the first modification of the rear wheel supporting device for a vehicle according to the present invention.

FIG. 13 is a left side view of the rear wheel supporting device for vehicle (first modification) according to the present invention. A rear wheel supporting device 120 of the first modification is characterized in that the power unit 91 is vertically swingably attached at the front portion to the pivot member 81 through a vibration-proof link mechanism 121. Other members are the same as the rear wheel supporting device 80 shown in FIG. 10 and are designated by the same reference numerals, which, therefore, will not be further described.

The vibration-proof link mechanism 121 is a mechanism for vertically swingably attaching the power unit 91 to the pivot shaft 87 through a vibration-proof link 123 by disposing a pivot shaft 122 of the power unit 91 to the rear of the pivot shaft 87 in the pivot member 81 and connecting the vibration-proof link 123 between the pivot shafts 87 and 122.

The vibration-proof link 123 is provided with rubber mounting portions 124, 124 at the top and bottom. Rubber stoppers 125, 125 that are made of an elastic material are attached to the rubber mounting portions 124, 124.

The upper and lower rubber stoppers 125, 125 are disposed so as to contact the rear surface of the first and second joining portions 82 and 83 of the pivot member 81. Therefore, the swing motion of the vibration-proof link 123 is elastically restricted by the rear surface of the first and second joining portions 82 and 83 and the upper and lower rubber stoppers 125, 125. That is, the upper and lower rubber stoppers 125, 125 function to absorb shocks during up-and-down swinging motion of the vibration-proof link 123, and also to be restored to a neutral position as shown.

Figure 14:
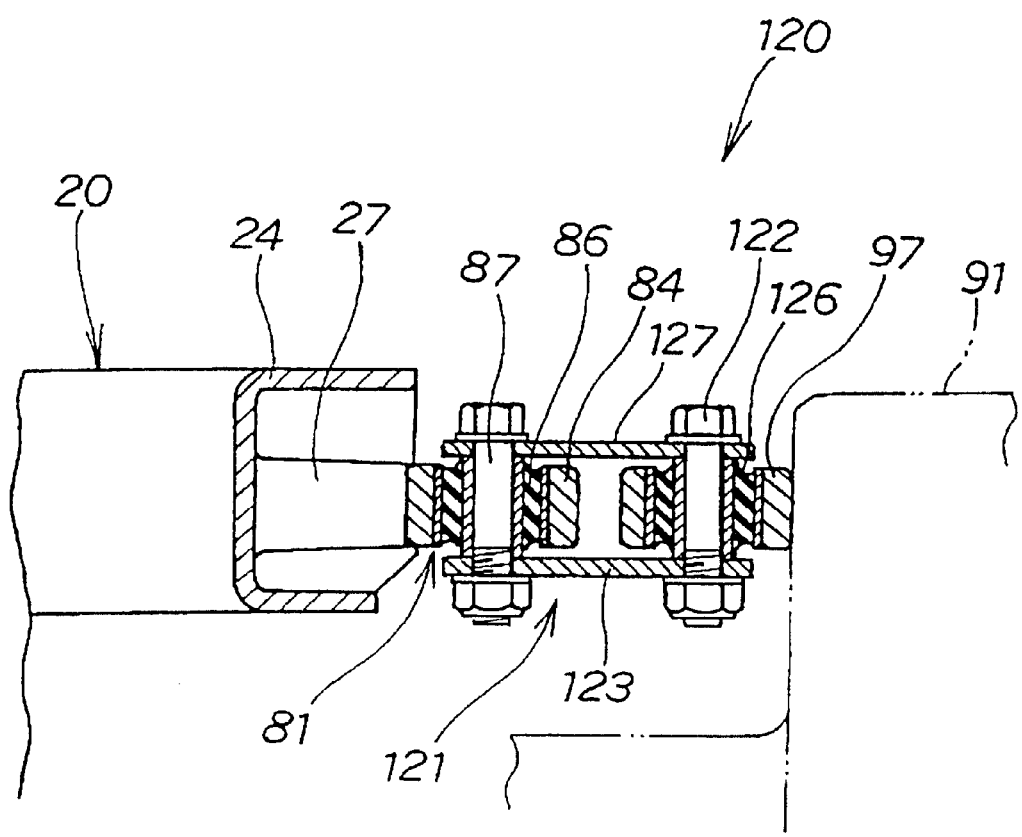
FIG. 14 is a sectional view seen from line 14—14 of FIG. 13.

FIG. 14 is a sectional view seen from line 14—14 of FIG. 13, showing that the pivot shaft 87 is inserted into the pivot portion 84 through the rubber bushing 86, the pivot shaft 122 is inserted into the hanger portion 97 of the power unit 91 through a rubber bushing 126, and the vibration-proof link 123 is connected between the front and rear pivot shafts 87 and 122. An auxiliary link 127 is mounted thereon.

Figure 15:
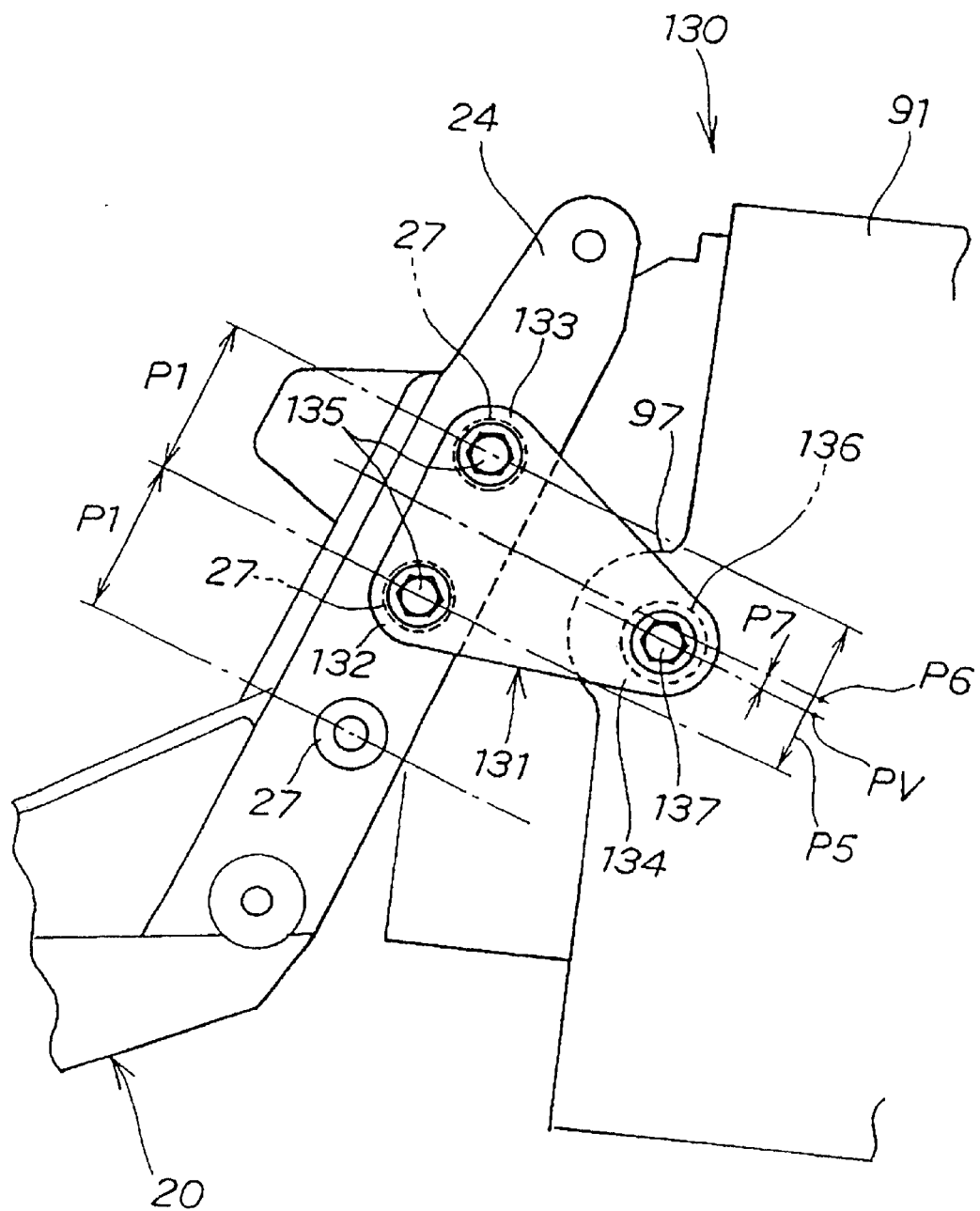
FIG. 15 is a left side view of a second modification of the rear wheel supporting device for a vehicle according to the present invention.

FIG. 15 is a left side view of the rear wheel supporting device (second modification) for vehicle according to the present invention.

The rear wheel supporting device 130 of the second modification is characterized in that a plurality of mounting portions 27 are mounted on the rear side portion of the vehicle body frame 20, and a flat pivot member 131 is attached on these mounting portions 27. The configuration of the rear wheel supporting device 130 is the same in other respects as the rear wheel supporting device 80 as shown in FIG. 10 and the same members are designated by the same reference numerals and will not be further described.

The vehicle body frame 20 is provided with a plurality of (e.g., three) mounting portions 27 which are vertically arranged on the side surface of the rear rising portion 24.

The pivot member 131 has two joining portions, upper and lower, that is, a first joining portion 132 and a second joining portion 133, attached on the rear side surface of the vehicle body frame 20, and a pivot portion 134 behind the first and second joining portions 132 and 133. The pitch P5 between the first and second joining portions 132 and 133, that is, the pitch P5 between the upper and lower bolt holes is equal to the vertical pitch P1 between the mounting portions 27, 27 (P1=P5). The middle height point P6 of the first and second joining portions 132 and 133 is located in the midpoint of the pitch P5.

The pivot member 131 can be connected to the rear portion of the vehicle body frame 20 by attaching the bolts 135, 135 to the first and second joining portions 132 and 133 of the desired mounting portions 27, 27.

The pivot portion 134 is attached on the pivot shaft 137 through the rubber bushing 136 in such a manner that the hanger portion 97 of the power unit 91 may be vertically swingable. Here, the center of the pivot shaft 137 is the pivot point PV.

The pivot member 131 has the pivot point PV moved toward the first joining portion 132 by the size P7 over the middle height point P6 of the first and second joining portions 132 and 133, that is, disposed at an offset position.

The mounting height of the pivot member 131 can be freely adjusted by selectively and removably attaching the first and second joining portions 132 and 133 to a plurality of mounting portions 27 which are vertically arranged on the vehicle body frame 20. Furthermore, the height position of the pivot point PV can be changed by attaching the pivot member 131 upside down to the mounting portions 27.

Figure 16:
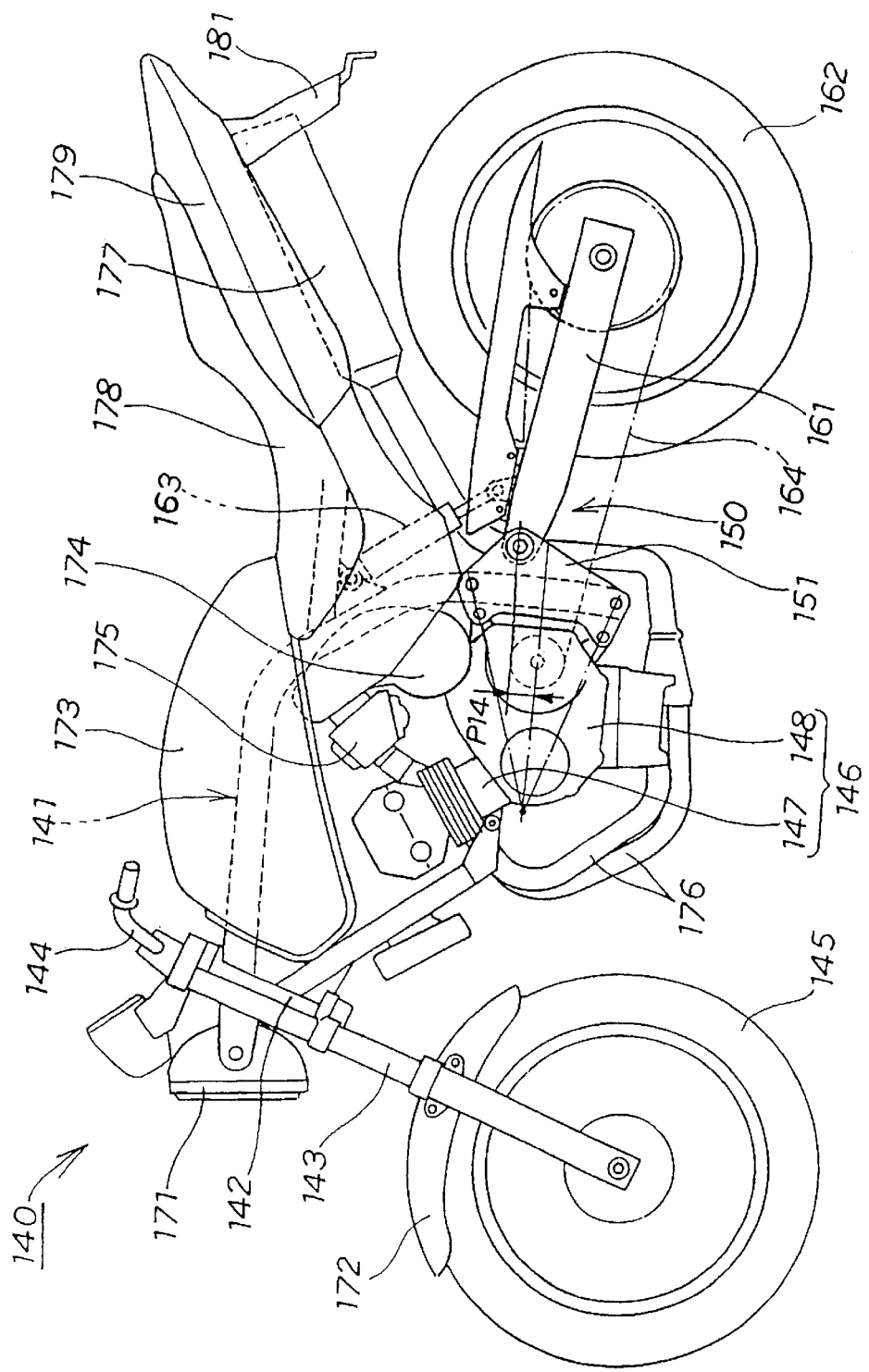
FIG. 16 is a left side view of the second embodiment of the motorcycle according to the present invention.

Next, the second embodiment will be explained with reference to FIGS. 16 to 20. FIG. 16 is a left side view of the motorcycle of the second embodiment according to the present invention. The motorcycle 140 of the second embodiment includes mainly a vehicle body frame 141, a front fork 143 mounted to the head pipe 142 of the vehicle body frame 141, a handlebar 144 connected to the upper portion of the front fork 143, a front wheel 145 mounted on the lower portion of the front fork 143, a power unit 146 mounted at the front lower portion of the vehicle body frame 141 (an assembly of an engine 147 at the front and a transmission mechanism 148 at the rear), and a rear wheel supporting device 150 mounted at the rear portion of the vehicle body frame 141.

The vehicle body frame 141 is equipped with a rear damper 163 supporting a rear swing arm 161 at the rear upper part. The power unit 146 functions to drive a rear wheel 162 through the drive chain 164.

In the rear wheel supporting device 150, a pivot member 151 is removably attached on the rear portion of the vehicle body frame 141. The rear swing arm 161 is vertically swingably attached on the pivot member 151. The rear wheel 162 is rotatably mounted on the rear portion of the rear swing arm 161. The rear swing arm 161 is a swing member.

FIG. 16 illustrates a headlight 171, a front fender 172, a fuel tank 173, an air cleaner 174, a carburetor 175, an exhaust pipe 176, a muffler 177, a seat 178, a rear cowl 179, and a rear fender 181.

FIGS. 17(a) and 17(b) are views showing the configuration of the second embodiment of the rear wheel supporting device for a vehicle according to the present invention, in which FIG. 17(a) shows the rear wheel supporting device as assembled, and FIG. 17(b) shows the rear wheel supporting device in an exploded state.

The rear wheel supporting device 150 is characterized in that a plurality of (e.g., two) mounting portions 141a are vertically arranged on the rear side surface of the vehicle body frame 141, and the height position of the pivot point PV can be changed by turning the pivot member 151 upside down.

The pivot member 151 has two joining portions, upper and lower, that is, a first joining portion 152 and a second joining portion 153, for attaching to the rear side surface of the vehicle body frame 141, and a pivot portion 154 at the rear of the first and second joining portions 152 and 153. The first and second joining portions 152 and 153 are through bolt holes, and the pivot portion 154 is a through pivot hole. The pitch P12 between the first and second joining portions 152 and 153 is equal to the pitch P11 between the mounting portions 141a, 141a (P11=P12). The middle height point P13 of the first and second joining portions 152 and 153 is located in the middle of the pitch P12. The pivot member 151 can be connected to the rear side surface of the vehicle body frame 141 by mounting bolts in the first and second joining portions 152 and 153 to the mounting portions 141a, 141a.

In the pivot portion 154, the rear swing arm 161 as the swing member is vertically swingably attached at the front to the pivot shaft 156. The pivot point PV is set at the center of the pivot shaft 156 (i.e., the center of the pivot portion 154).

The pivot member 151 is characterized by having the pivot point PV in a position moved by the size P14 toward the first joining portion 152 from the middle height point P13 of the first and second joining portions 152 and 153, that is, in the offset position.

Power unit mounting holes 157, 157 are provided in the pivot member 151.

Figure 18:
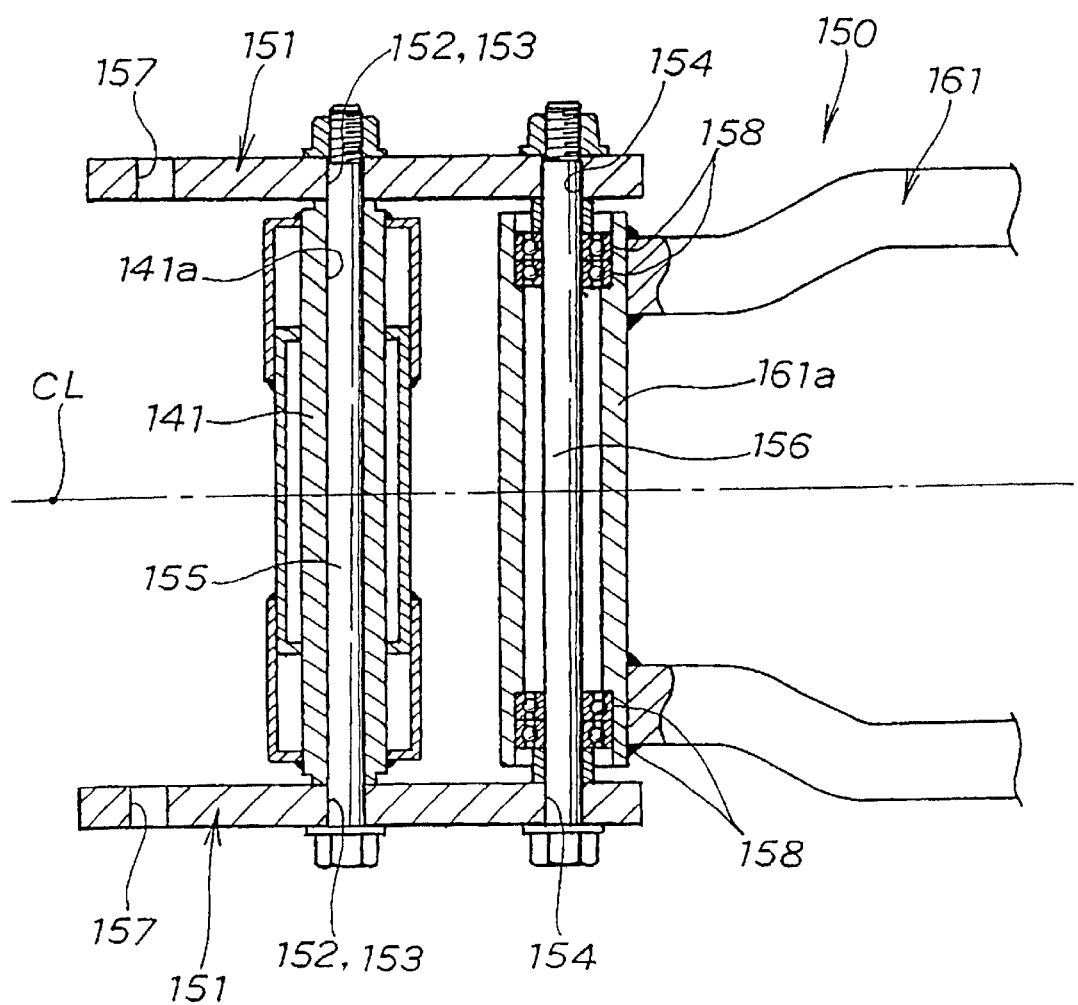
FIG. 18 is a plan sectional view showing the second embodiment of the rear wheel supporting device for a vehicle according to the present invention.

FIG. 18 is a plan sectional view of the second embodiment of the rear wheel supporting device for a vehicle according to the present invention, as seen from line 18—18 of FIG. 17(a). FIG. 18 shows the following configurations (1) to (3). The pivot members 151, 151 are a pair of right and left flat plates. The bolt 155 is inserted into the mounting portion 141a of the vehicle body frame 141 with the front portion of the right and left pivot members 151, 151 set on both right and left side surfaces of the vehicle body frame 141.

The pivot members 151, 151 are attached to the vehicle body frame 141 by tightening the bolt 155, the vehicle body frame 141 and the right and left pivot members 151, 151 together.

The rear swing arm 161 can be vertically swingably attached to the pivot members 151, 151 by inserting the pivot tube 161a at the front of the rear swing arm 161 between the pivot members 151, 151 and inserting the pivot shaft 156 into the pivot portions 154, 154 and the pivot tube 161a. Bearings 158, 158 are provided within the pivot tube 161a.

Figure 19:
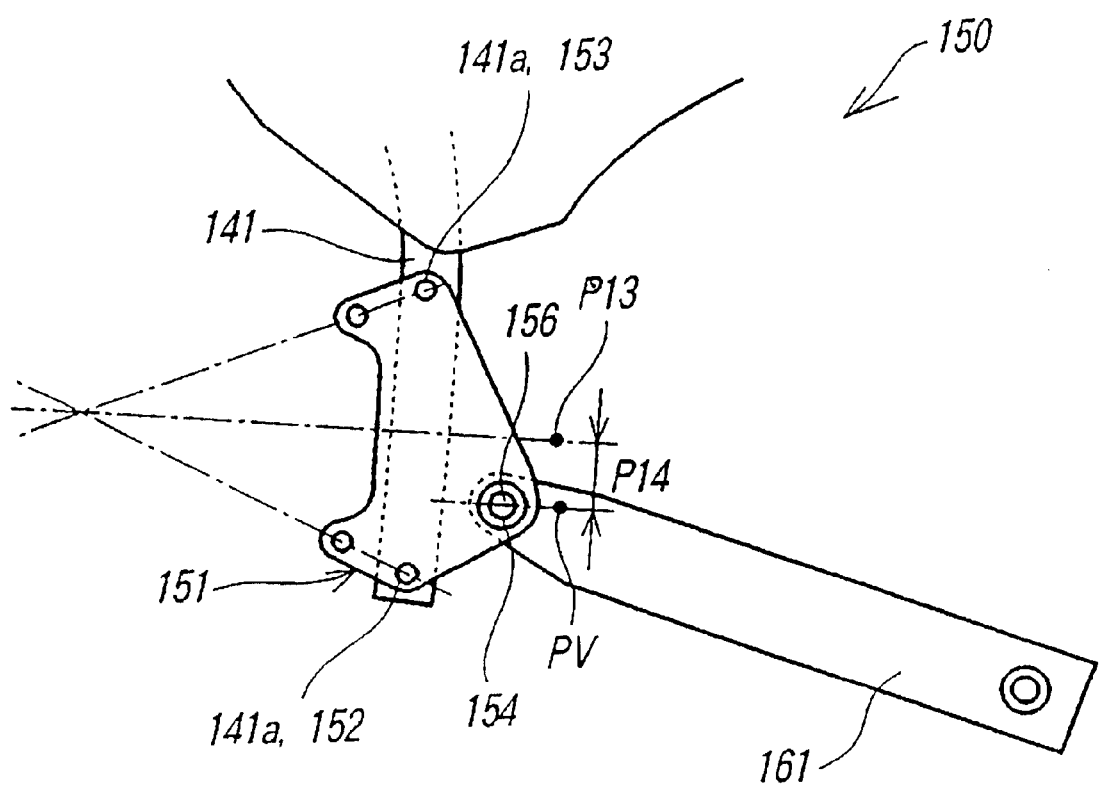
FIG. 19 is a view showing the operation of the second embodiment of the rear wheel supporting device for a vehicle according to the present invention.

FIG. 19 is a view showing the operation of the second embodiment of the rear wheel supporting device for vehicle according to the present invention.

The height position of the pivot point PV can be changed by attaching the pivot member 151 upside down to a plurality of mounting portions 141a, 141a vertically arranged on the vehicle body frame 141. Therefore, the height position of the pivot point PV relative to the vehicle body frame 141 can be altered in accordance with the diameter of the rear wheel 162 shown in FIG. 16. Consequently, the vehicle body frame 141 is commonly usable if the diameter of the rear wheel 162 is changed, thereby enabling cost reduction of the motorcycle 140.

Figure 20:
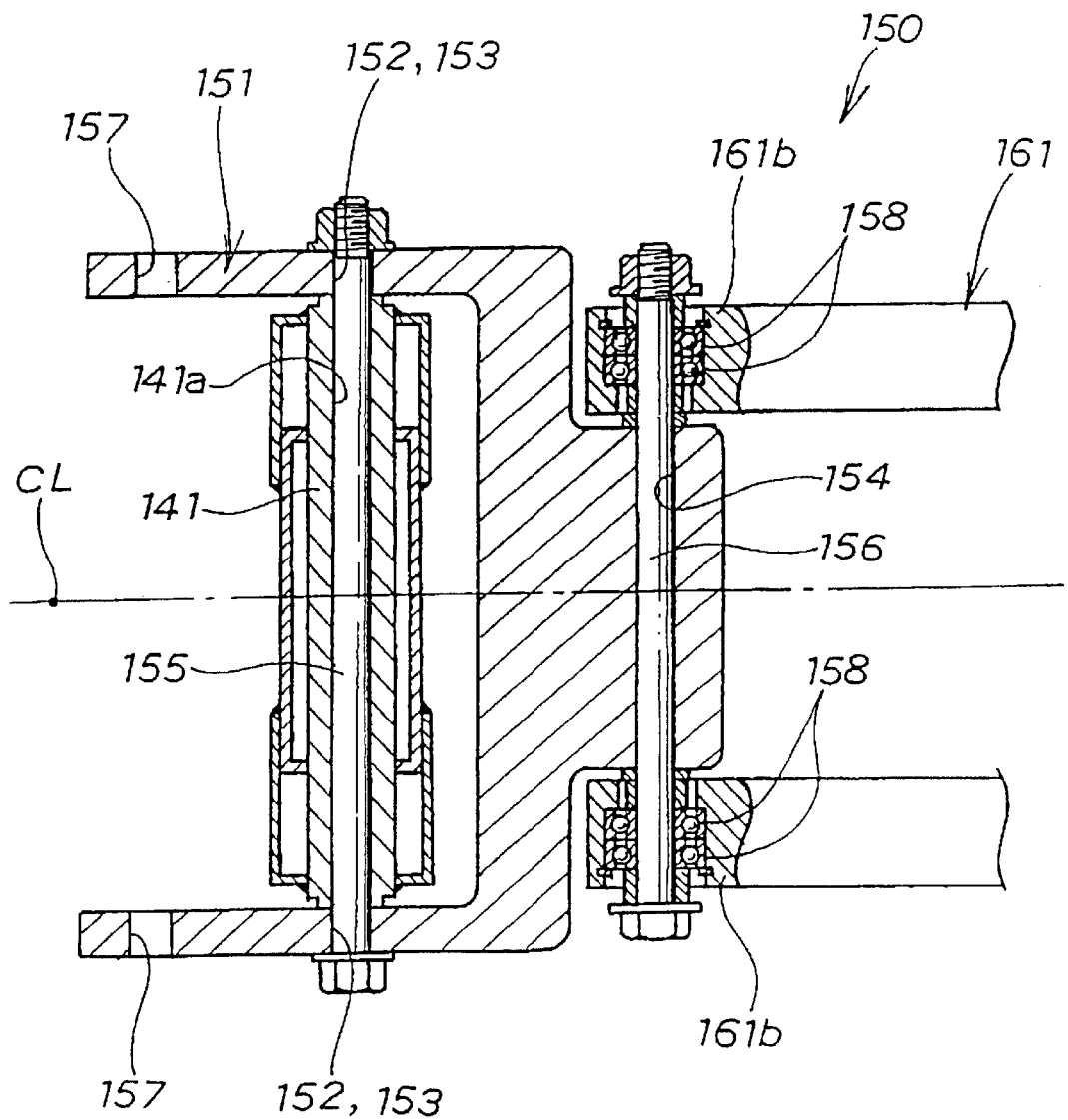
FIG. 20 is a modification of the second embodiment of the rear wheel supporting device for a vehicle according to the present invention.

FIG. 20 shows a modification of the second embodiment of the rear wheel supporting device for vehicle according to the present invention. The modification is characterized in that a pair of right and left pivot members 151, 151 shown in FIG. 18 are unitarily formed.

To be more specific, the pivot member 151 formed by unitizing the right and left members is provided with one pivot portion 154 on the centerline CL of the vehicle width. In this case, the rear swing arm 161 is bifurcated at the front as viewed in a plan view, and is provided with swing base end portions 161b, 161b on the right and left front ends. The rear swing arm 161 can be vertically swingably attached to the pivot member 151 by inserting the pivot shaft 156 into the pivot portion 154 and the right and left swing base end portions 161b, 161b.

It should be noted that, in the embodiments of the present invention, the vehicle is not limited to the motorcycle 10, 140 and may be a three-wheeled vehicle for example.

The universal joint 56 may be just a constant-speed shaft joint for connection between the first and second links 52 and 54, and may be a ball joint, a universal joint, or an equivalent.

Furthermore, a plurality of mounting portions 27 and 141a vertically arranged may be such that are provided on at least one of the vehicle body frames 20 and 141 and the pivot members 81, 131 and 151.

Furthermore, when the vehicle body frames 20 and 141 are provided with the mounting portions 27, 141a, it is sufficient that at least two of the first and second joining portions 82, 83, 132, 133, 152, and 153 are provided in the upper and lower positions on the pivot member 81, 131, and 151.

The rear wheel supporting device of the present invention having the above-described configuration has the following advantage.

To attain the above-described object, a plurality of mounting portions are vertically arranged on at least one of the vehicle body frame and the pivot member; and therefore the mounting height of the pivot member, therefore, can be freely adjusted by selecting the plurality of vertically arranged mounting portions in accordance with the rear wheel diameter, and attaching the pivot member. As a result, it is possible to freely adjust the mounting height of the swing member. Therefore, if the rear wheel diameter has been changed, the vehicle body frame and the swing member are commonly usable, thereby enabling to reduce the cost of two- and three-wheeled vehicles.

The pivot member has at least two joining portions, upper and lower, that is, the first and second joining portions, for connection to the vehicle body frame, and a pivot is set in a position located close to the first joining portion away from the middle height between the first and second joining portions. It is, therefore, possible to change the height position of the pivot point by attaching the first and second joining portions to the vehicle body frame with the pivot member turned upside down in accordance with the rear wheel diameter. Consequently the mounting height of the swing member is freely changeable, thus enabling the common use of the vehicle body frame and the swing member if the rear wheel diameter has been changed and accordingly a reduction in cost of the two- and three-wheeled vehicles.

In the rear wheel supporting device for a vehicle, the pivot member is removably attached on the rear portion of the vehicle body frame; the swing member is vertically swingably attached on the pivot member; and the rear wheel is rotatably mounted on the rear portion of the swing member; the rear wheel supporting device, including the pivot member is attached on the rear surface of the vehicle body frame. The pivot member, being attached on the rear surface of the vehicle body frame, can be removed from the rear of the vehicle body frame.

According to the prior art described above, the eccentric cam 12a is rotatably mounted in a hole formed in the frame 2 in the direction of the vehicle width, and the pivot 3 of the rear swing arm 1 is rotatably installed in an offset shaft hole 13 of the eccentric cam 12a. Widening the range of the mounting height of the pivot 3 increases the diameter of the eccentric cam 12a, affecting the shape and size of the frame 2 on which the eccentric cam 12a is mounted.

However, the pivot member is attached from the rear to the rear surface of the vehicle body frame, and therefore the vehicle body frame is slightly affected if the range of the mounting height of the pivot member is freely set. Therefore, the vehicle body frame is commonly usable if the rear wheel diameter has been changed, thus reducing the cost of two- and three-wheeled vehicles.

Furthermore, it is possible to freely set the wheelbase between the front and rear wheels by changing the shape and size of the pivot member.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A rear wheel supporting device for a vehicle comprising:

a pivot member removably attached at a rear portion of a vehicle body frame;

a swing member pivotally attached to said pivot member; and a rear wheel rotatably mounted on the rear portion of said swing member;

said rear wheel supporting device includes a plurality of joining portions which are vertically arranged and provided on at least one of said vehicle body frame and said pivot member, to thereby enable free adjustment of a mounting height of said pivot member.

2. The rear wheel supporting device for a vehicle according to claim 1, wherein said pivot member includes a first joining portion and a second joining portion and said vehicle body frame includes a plurality of mounting portions, wherein securing said first joining portion and said second joining portion to predetermined mounting portions on said vehicle body frame enables an adjustment in the height of said pivot member relative to said vehicle body frame.

3. The rear wheel supporting device for a vehicle according to claim 2, wherein said plurality of mounting portions includes four mounting portions for mounting said pivot member relative to said vehicle body frame.

4. The rear wheel supporting device for a vehicle according to claim 2, wherein said first joining portion extends a first predetermined distance from said pivot member and said second joining portion extends a second predetermined distance that is less than said first predetermined distance wherein mounting said pivot member relative to said vehicle body frame in a first orientation positions the pivot member at a first height relative to a ground surface and wherein rotating said pivot member 180° enables an adjustment in the height of said pivot member relative to a ground surface.

5. The rear wheel supporting device for a vehicle according to claim 1, wherein said pivot member includes a pivot point for mounting said swing member for pivoting movement relative to said pivot member.

6. The rear wheel supporting device for a vehicle according to claim 4, wherein said plurality of mounting portions includes four mounting portions for mounting said pivot member relative to said vehicle body frame whereby securing said pivot member relative to a first and a third mounting portion enables a first and a second height adjustment relative to the orientation of said pivot member relative to said first and third mounting portions and securing said pivot member relative to a second and a fourth mounting portion enables a third and a fourth height adjustment relative to the orientation of said pivot member relative to said third and fourth mounting portions.

7. A rear wheel supporting device for a vehicle comprising:

a pivot member removably attached on a rear portion of a vehicle body frame;

a swing pivotally swingably attached to said pivot member; and a rear wheel rotatably mounted on the rear portion of said swing member;

said pivot member including first and second joining portions in at least two points, upper and lower, for joining said rear wheel supporting device to said vehicle body frame, and a pivot point located in a position close to the first joining portion above the middle height of said first and second joining portions, for altering the height position of said pivot point by turning said pivot member upside down.

8. The rear wheel supporting device for a vehicle according to claim 7, wherein said pivot member includes a plate having said first and second joining portions wherein securing said first joining portion and said second joining portion to said vehicle body frame enables an adjustment in the height of said pivot member relative to said vehicle body frame.

9. The rear wheel supporting device for a vehicle according to claim 8, wherein said first joining portion extends a first predetermined distance from the attachment of said swing member to said pivot member and said second joining portion extends a second predetermined distance that is greater than said first predetermined distance wherein mounting said pivot member relative to said vehicle body frame in a first orientation positions the pivot member at a first height relative to a ground surface and wherein rotating said pivot member 180° enables an adjustment in the height of said pivot member relative to a ground surface.

10. The rear wheel supporting device for a vehicle according to claim 7, wherein said pivot member includes a pivot portion for mounting said swing member for pivoting movement relative to said pivot member.

11. A rear wheel supporting device for a vehicle comprising:

a pivot member removably attached on a rear side portion of a vehicle body frame;

a swing member pivotally attached to said pivot member; and a rear wheel rotatably mounted on the rear portion of said swing member, said vehicle body frame including a plurality of mounting portions on the rear side portion thereof, wherein the pivot member may be attached in a plurality of different positions with respect to said plurality of mounting portions.

12. The rear wheel supporting device for a vehicle according to claim 11, wherein said pivot member includes a first joining portion and a second joining portion, wherein securing said first joining portion and said second joining portion to predetermined mounting portions on said vehicle body frame enables an adjustment in the height of said pivot member relative to said vehicle body frame.

13. The rear wheel supporting device for a vehicle according to claim 12, wherein said plurality of mounting portions includes four mounting portions for mounting said pivot member relative to said vehicle body frame.

14. The rear wheel supporting device for a vehicle according to claim 12, wherein said first joining portion extends a first predetermined distance from said pivot member and said second joining portion extends a second predetermined distance that is less than said first predetermined distance wherein mounting said pivot member relative to said vehicle body frame in a first orientation positions the pivot member at a first height relative to a ground surface and wherein rotating said pivot member 180° enables an adjustment in the height of said pivot member relative to a ground surface.

15. The rear wheel supporting device for a vehicle according to claim 11, wherein said pivot member includes a pivot point for mounting said swing member for pivoting movement relative to said pivot member.

16. The rear wheel supporting device for a vehicle according to claim 14, wherein said plurality of mounting portions includes four mounting portions for mounting said pivot member relative to said vehicle body frame whereby securing said pivot member relative to a first and a third mounting portion enables a first and a second height adjustment relative to the orientation of said pivot member relative to said first and third mounting portions and securing said pivot member relative to a second and a fourth mounting portion enables a third and a fourth height adjustment relative to the orientation of said pivot member relative to said third and fourth mounting portions.

* * * * *